(12) United States Patent
Choi et al.

(10) Patent No.: US 11,678,353 B2
(45) Date of Patent: Jun. 13, 2023

(54) METHOD FOR PERFORMING UPLINK TRANSMISSION IN WIRELESS COMMUNICATION SYSTEM AND DEVICE THEREFOR

(71) Applicant: LG ELECTRONICS INC., Seoul (KR)

(72) Inventors: Kukheon Choi, Seoul (KR); Jiwon Kang, Seoul (KR); Jonghyun Park, Seoul (KR); Kunil Yum, Seoul (KR)

(73) Assignee: LG Electronics Inc., Seoul (KR)

( * ) Notice: Subject to any disclaimer, the term of this patent is extended or adjusted under 35 U.S.C. 154(b) by 302 days.

(21) Appl. No.: 17/053,488

(22) PCT Filed: May 9, 2019

(86) PCT No.: PCT/KR2019/095013
§ 371 (c)(1),
(2) Date: Nov. 6, 2020

(87) PCT Pub. No.: WO2019/216750
PCT Pub. Date: Nov. 14, 2019

(65) Prior Publication Data
US 2021/0144716 A1    May 13, 2021

(30) Foreign Application Priority Data
May 9, 2018    (KR) .......................... 10-2018-0052839

(51) Int. Cl.
*H04W 72/53*    (2023.01)
*H04W 76/27*    (2018.01)
(Continued)

(52) U.S. Cl.
CPC .......... *H04W 72/53* (2023.01); *H04B 7/0626* (2013.01); *H04L 5/0048* (2013.01);
(Continued)

(58) Field of Classification Search
None
See application file for complete search history.

(56) References Cited

U.S. PATENT DOCUMENTS 11,470,676 B2 * 10/2022 Chen .................... H04L 5/0096
11,483,837 B2 * 10/2022 Futaki ................ H04W 72/048
(Continued)

FOREIGN PATENT DOCUMENTS

WO    2017083489    5/2017

OTHER PUBLICATIONS

Interdigital, Inc. "Remaining issues on beam management," R1-1718482, 3GPP TSG RAN WG1 Meeting 90bis, Prague, Czech, Oct. 3, 2017, see section 2.1.2.2; and figure 2.
(Continued)

*Primary Examiner* — Otis L Thompson, Jr.
(74) *Attorney, Agent, or Firm* — Dentons US LLP

(57) ABSTRACT

Disclosed are a method for performing uplink transmission or reception in a wireless communication system and a device therefor. Specifically, a method for performing uplink transmission by a terminal in a wireless communication system may comprise the steps of: receiving, from a base station, a configuration relating to a beam association between a resource in a first frequency band and a resource in a second frequency band; allocating, by the base station, the resource in the first frequency band to the terminal, wherein the first frequency band does not overlap with the second frequency band; switching the first frequency band to the second frequency band; allocating, by the base station, the resource in the second frequency band to the terminal; and on the basis of the configuration relating to the beam association, performing the uplink transmission on the resource in the second frequency band.

15 Claims, 15 Drawing Sheets

(51) Int. Cl.
| | |
|---|---|
| *H04B 7/06* | (2006.01) |
| *H04L 5/00* | (2006.01) |
| *H04L 25/02* | (2006.01) |
| *H04W 72/0453* | (2023.01) |
| *H04W 72/044* | (2023.01) |
| *H04W 80/02* | (2009.01) |
| *H04W 72/23* | (2023.01) |

(52) U.S. Cl.
CPC ....... *H04L 25/0226* (2013.01); *H04W 72/046* (2013.01); *H04W 72/0453* (2013.01); *H04W 72/23* (2023.01); *H04W 76/27* (2018.02); *H04W 80/02* (2013.01)

(56) References Cited

U.S. PATENT DOCUMENTS

| | | | | |
|---|---|---|---|---|
| 2011/0143807 | A1* | 6/2011 | Aue | H04B 7/0671 |
| | | | | 370/280 |
| 2018/0323855 | A1* | 11/2018 | Noh | H04W 72/042 |
| 2019/0045549 | A1* | 2/2019 | Wu | H04W 72/085 |
| 2019/0159136 | A1* | 5/2019 | MolavianJazi | H04L 5/001 |
| 2019/0313391 | A1* | 10/2019 | Lin | H04W 74/02 |
| 2020/0119808 | A1* | 4/2020 | Parr | H04L 1/1692 |
| 2021/0076445 | A1* | 3/2021 | Tsai | H04L 5/003 |
| 2021/0167930 | A1* | 6/2021 | Jeon | H04B 17/318 |

OTHER PUBLICATIONS

LG Electronics, "Remaining issues on SRS," R1-1804548, 3GPP TSG RAN WG1 Meeting #92bis, Sanya, China, Apr. 7, 2018, see sections 1-6.

Qualcomm, "Disucssion on QCL," R1-1718551, 3GPP TSG RAN WG1 Meeting 90bis, Prague, Czech, Oct. 3, 2017, see sections 1-2.5.

* cited by examiner

【FIG. 1】
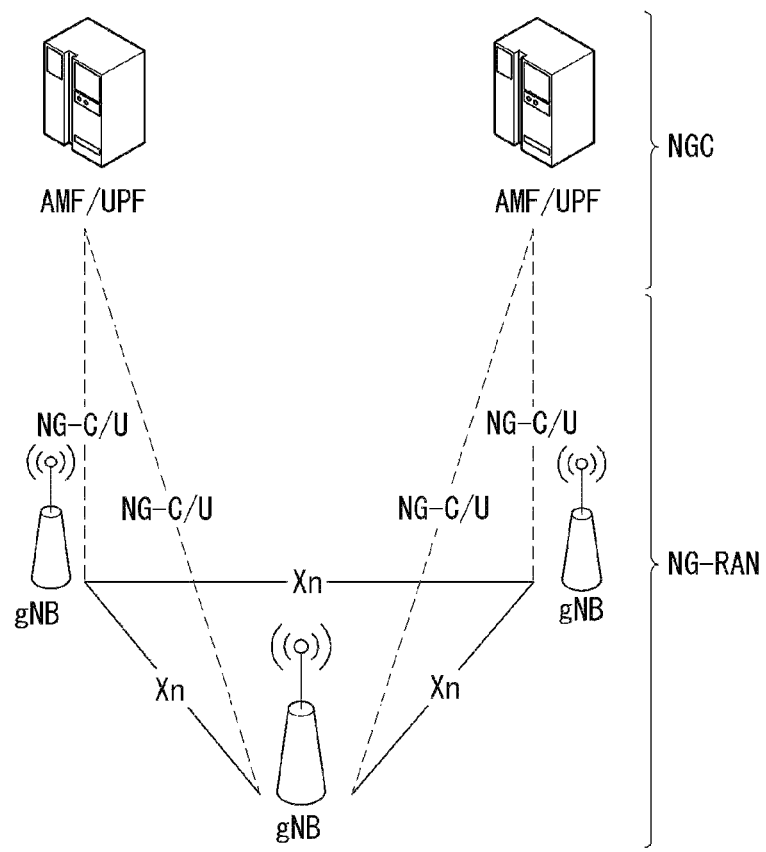
【FIG. 2】
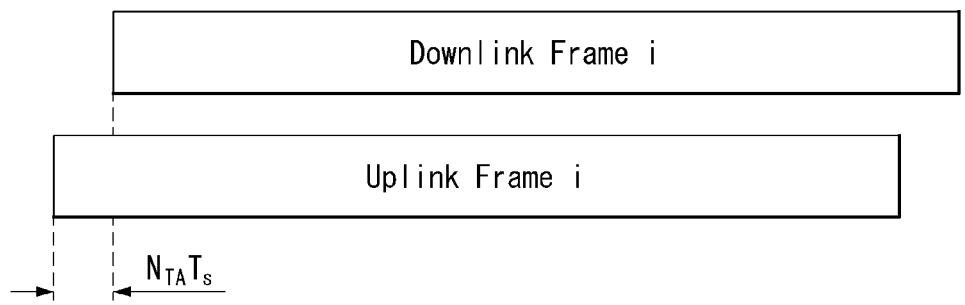

[FIG. 4]
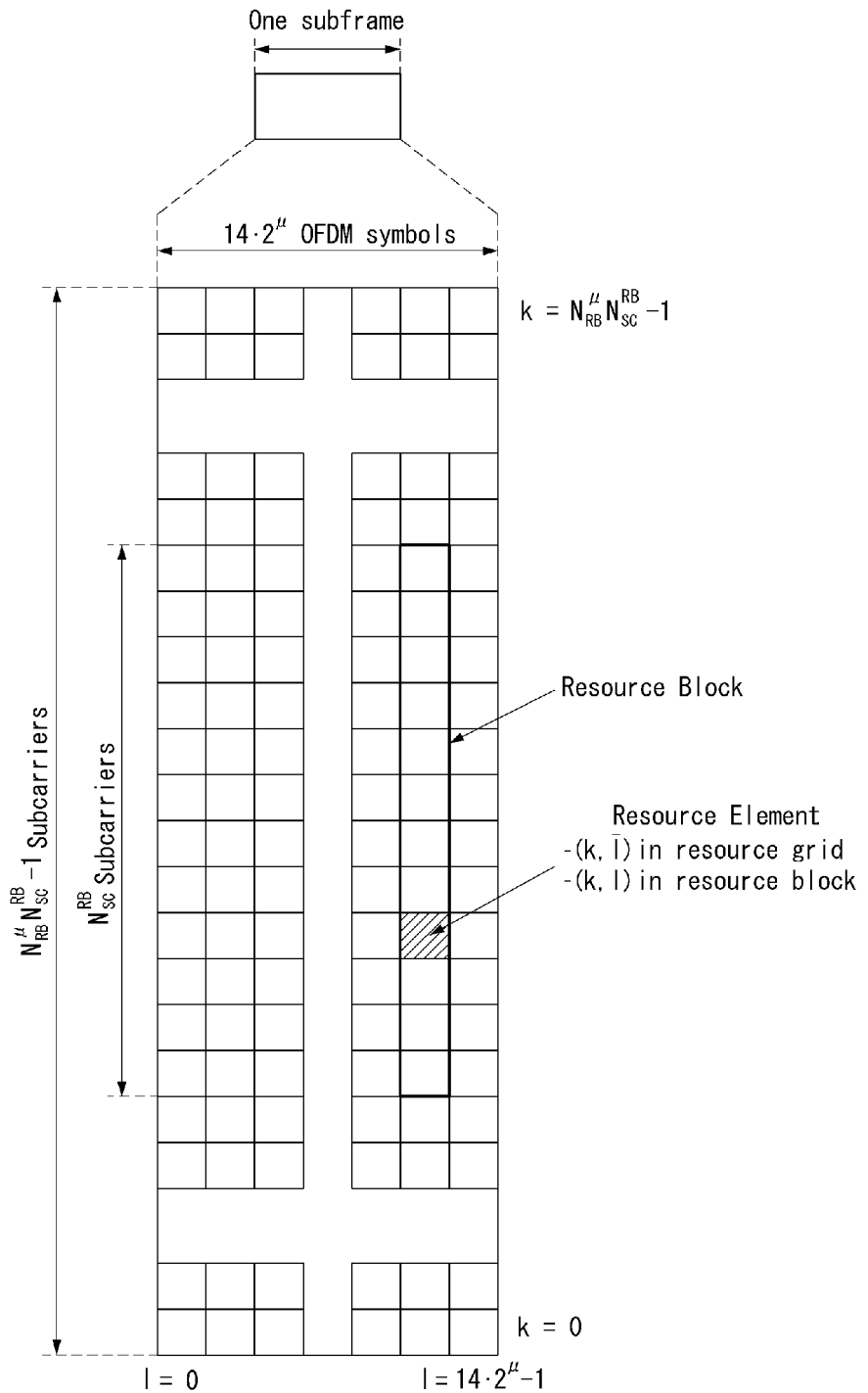

[FIG.5]
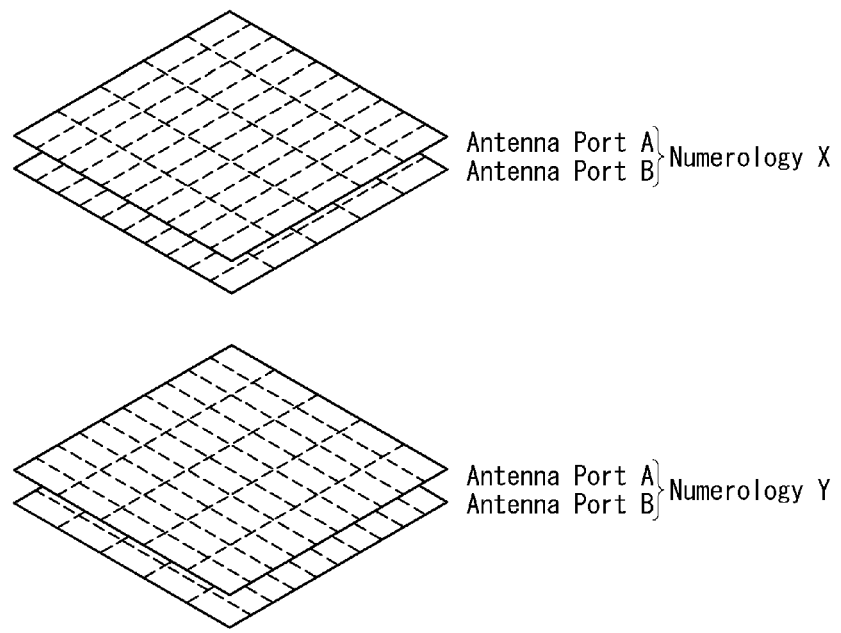
[FIG.6]
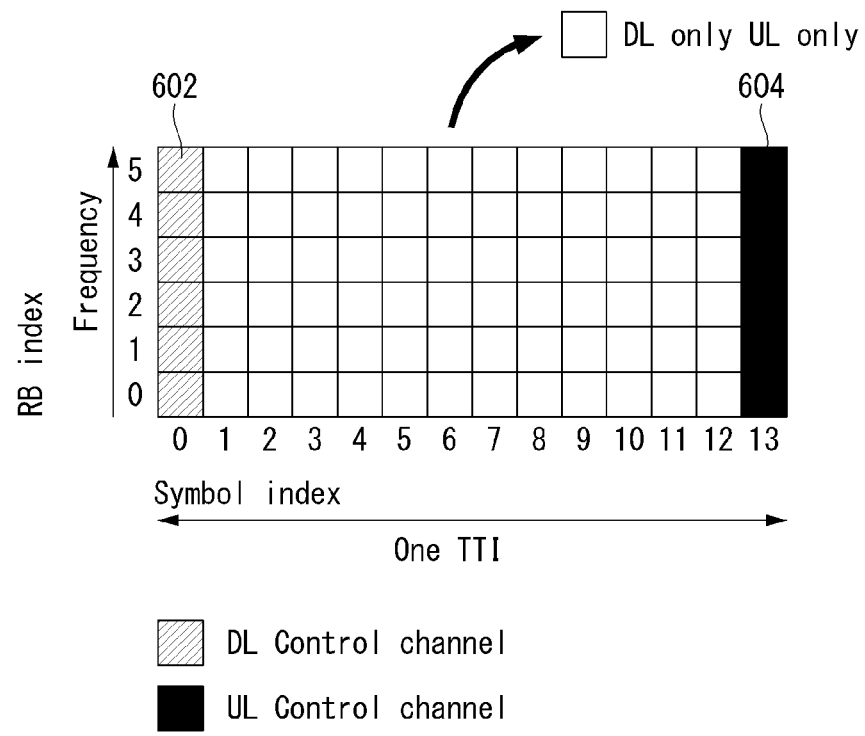

[FIG. 7]
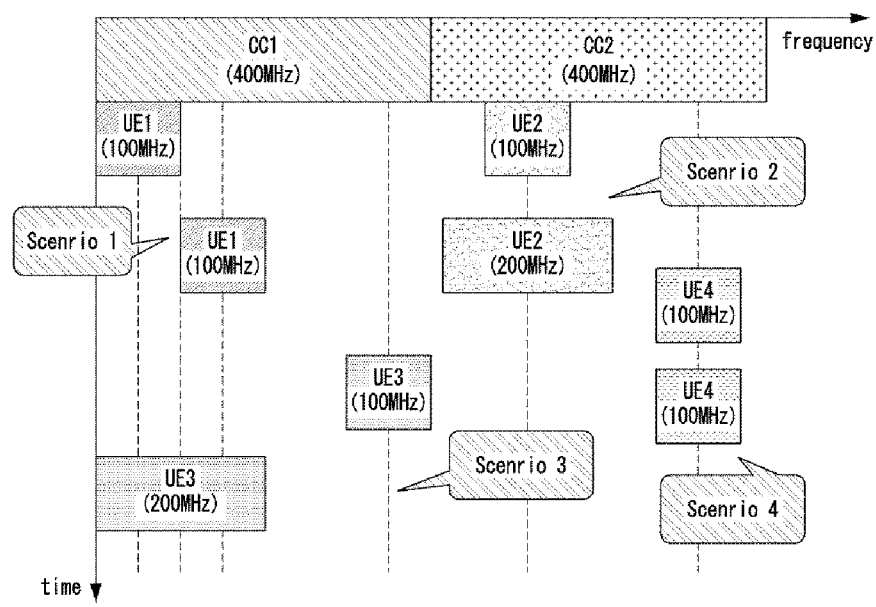

[FIG. 8]
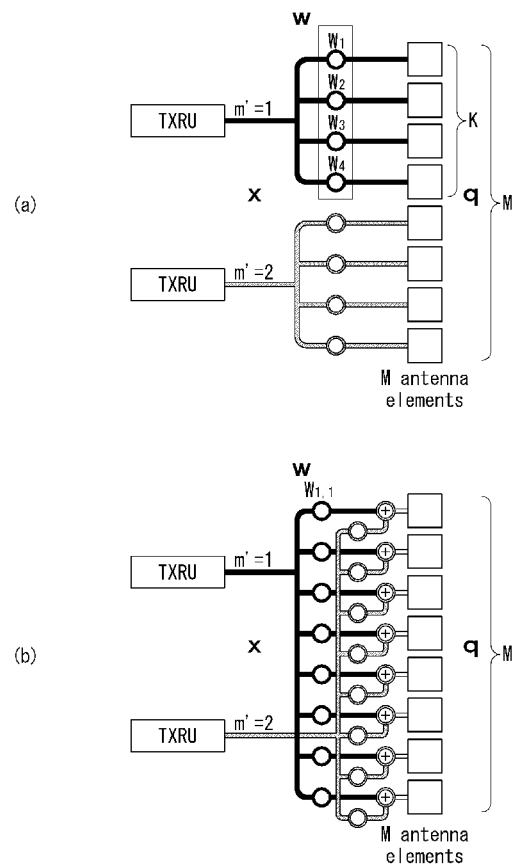
[FIG. 9]
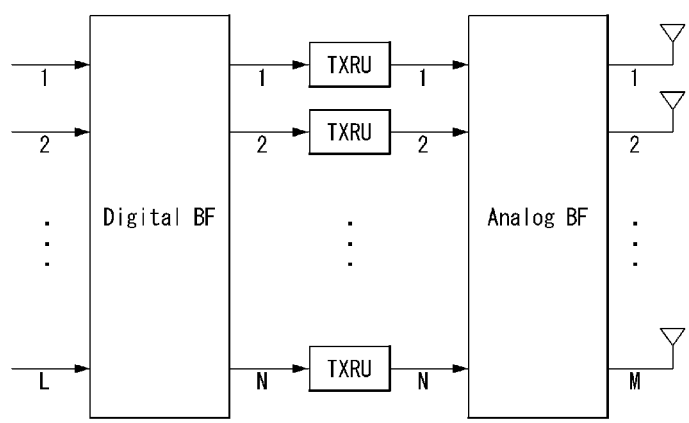

[FIG. 10]
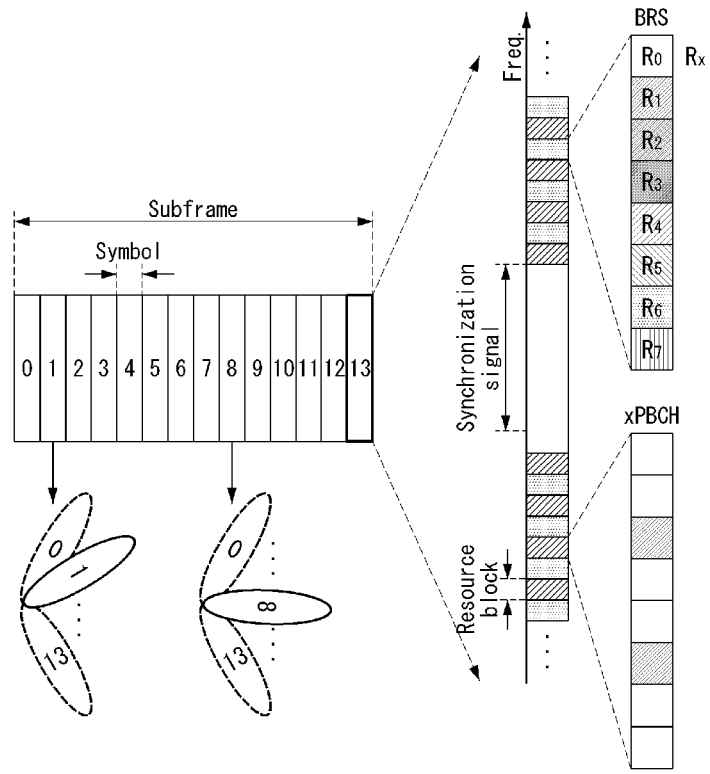
[FIG. 11]
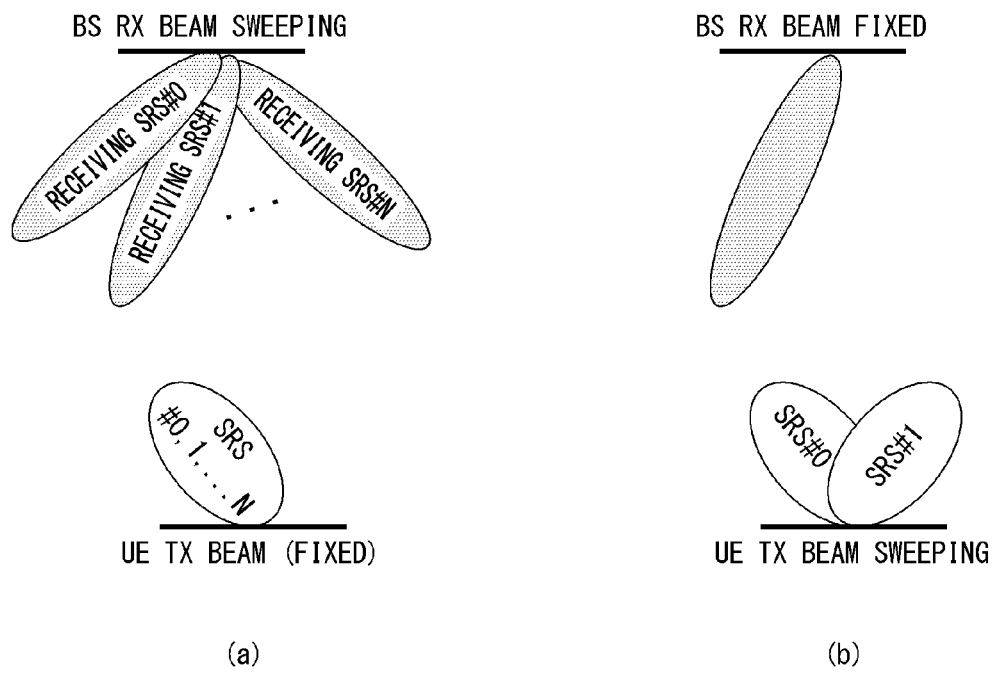
(a)　　　　　　　　　　　(b)

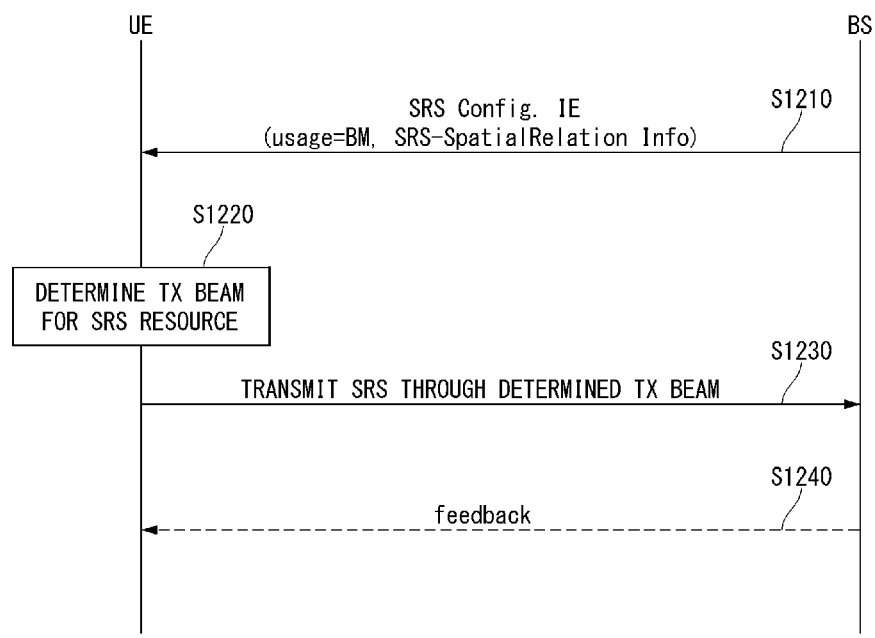

[FIG. 13]
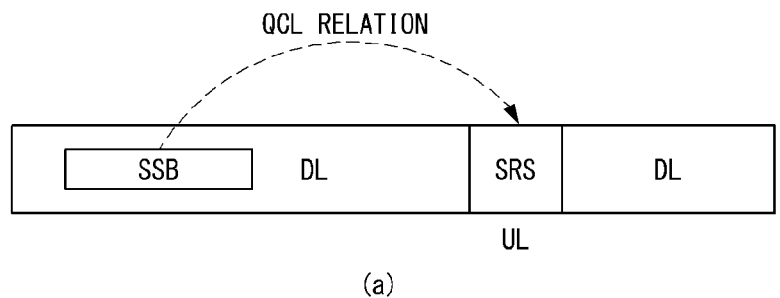
(a)
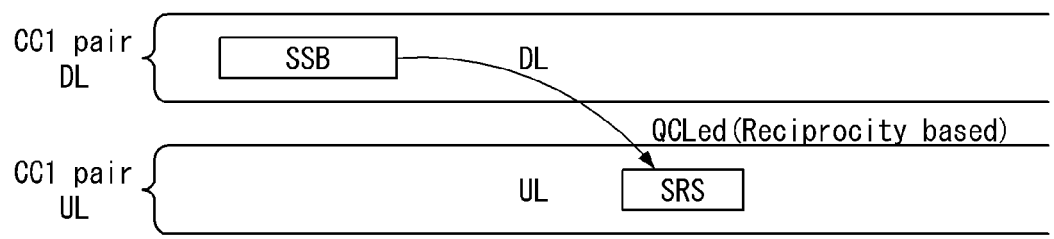
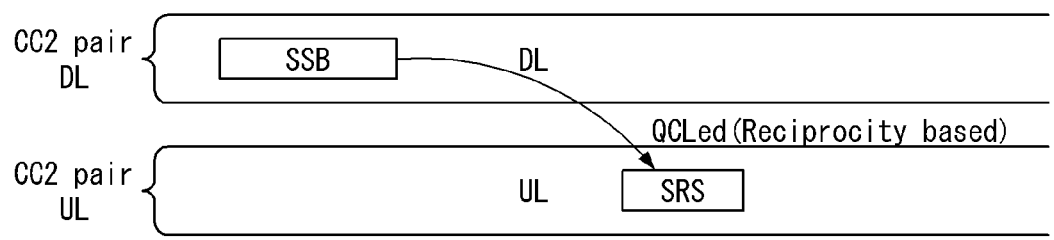
(b)

[FIG. 14]
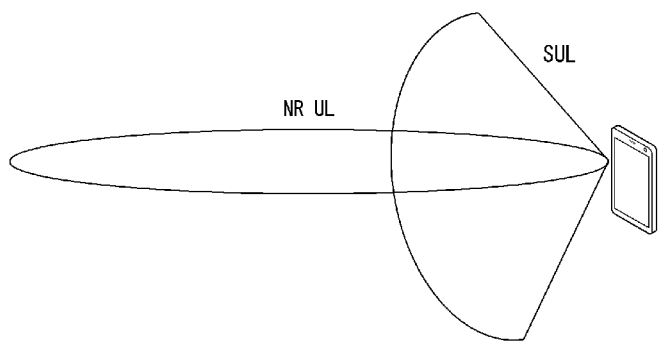
[FIG. 15]
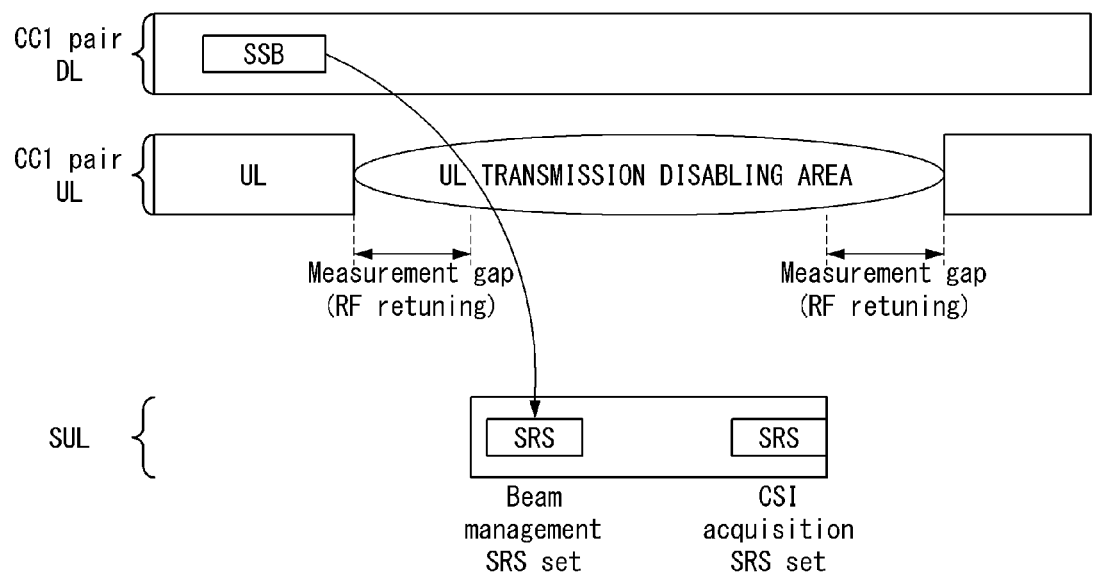

[FIG. 16]
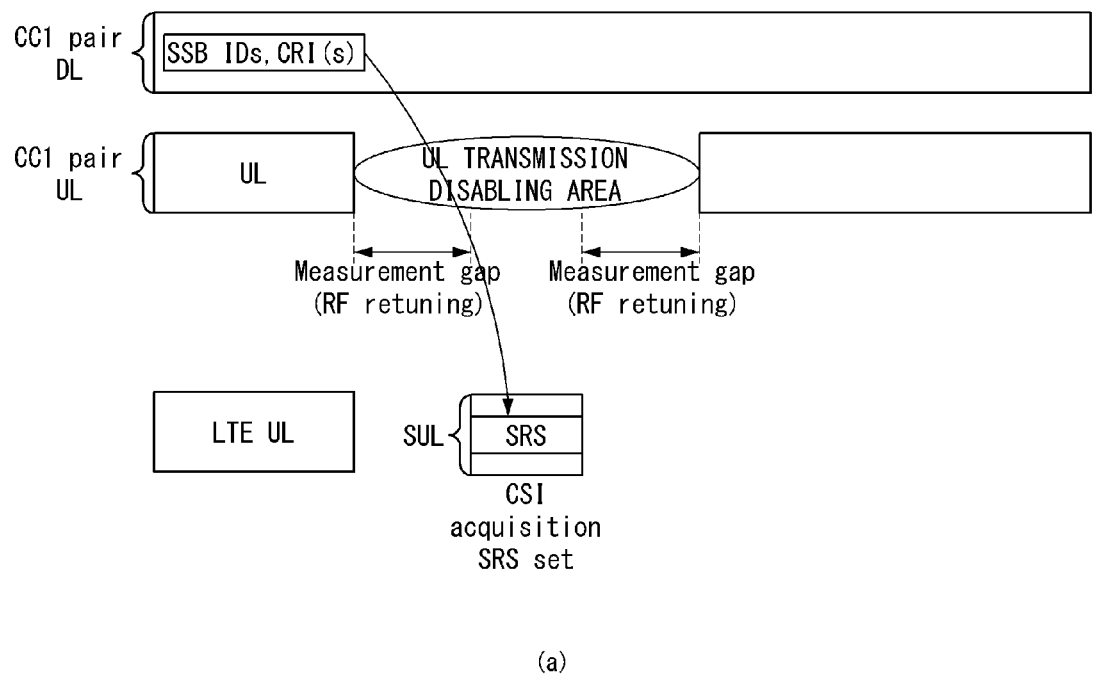
(a)
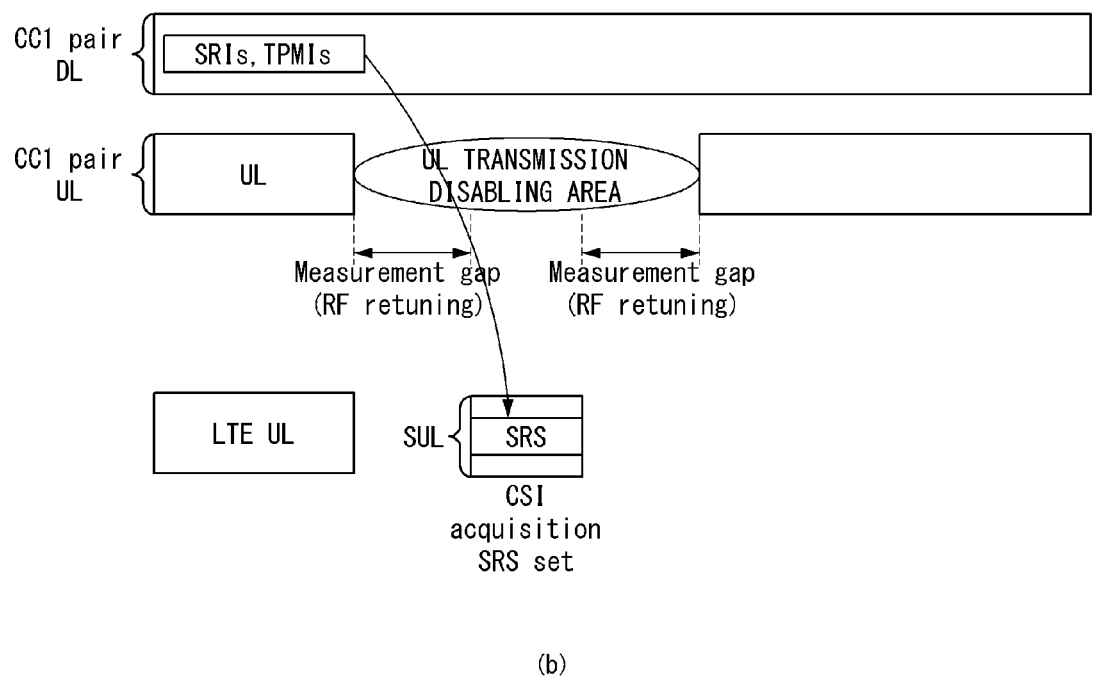
(b)

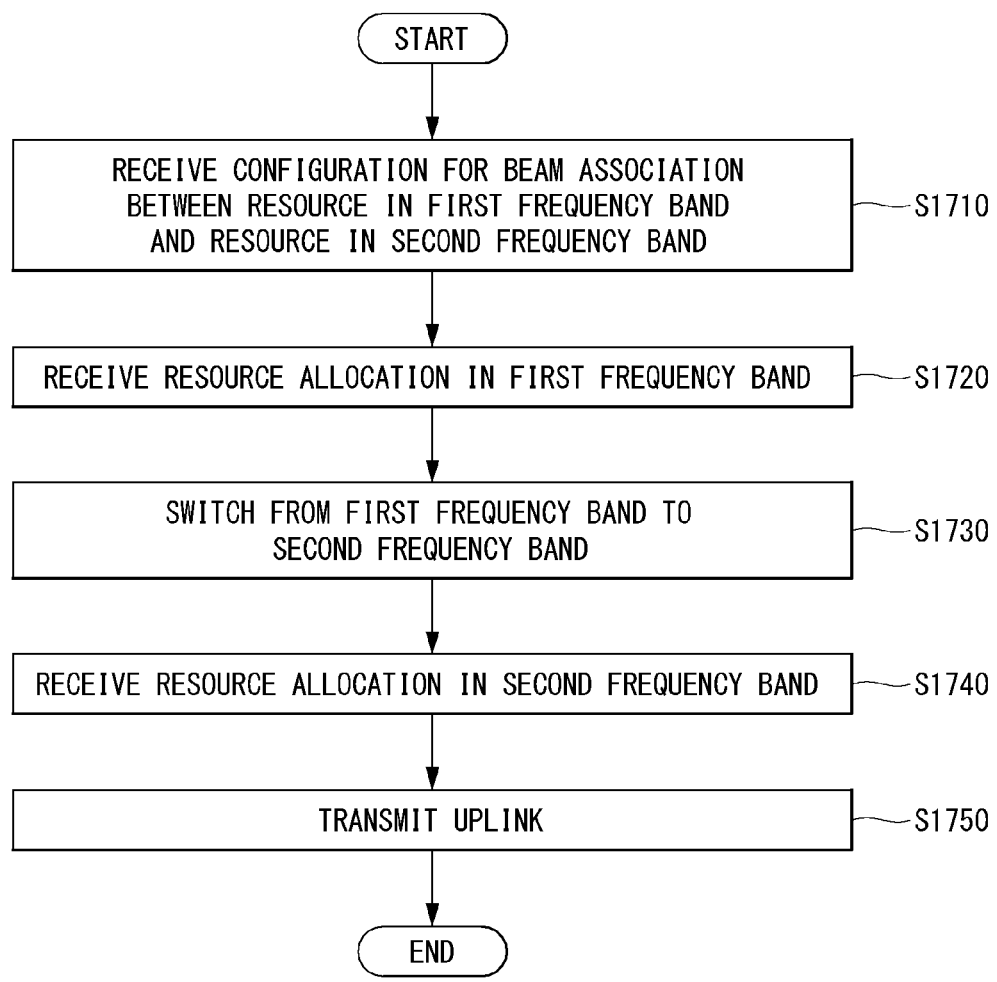
[FIG. 17]

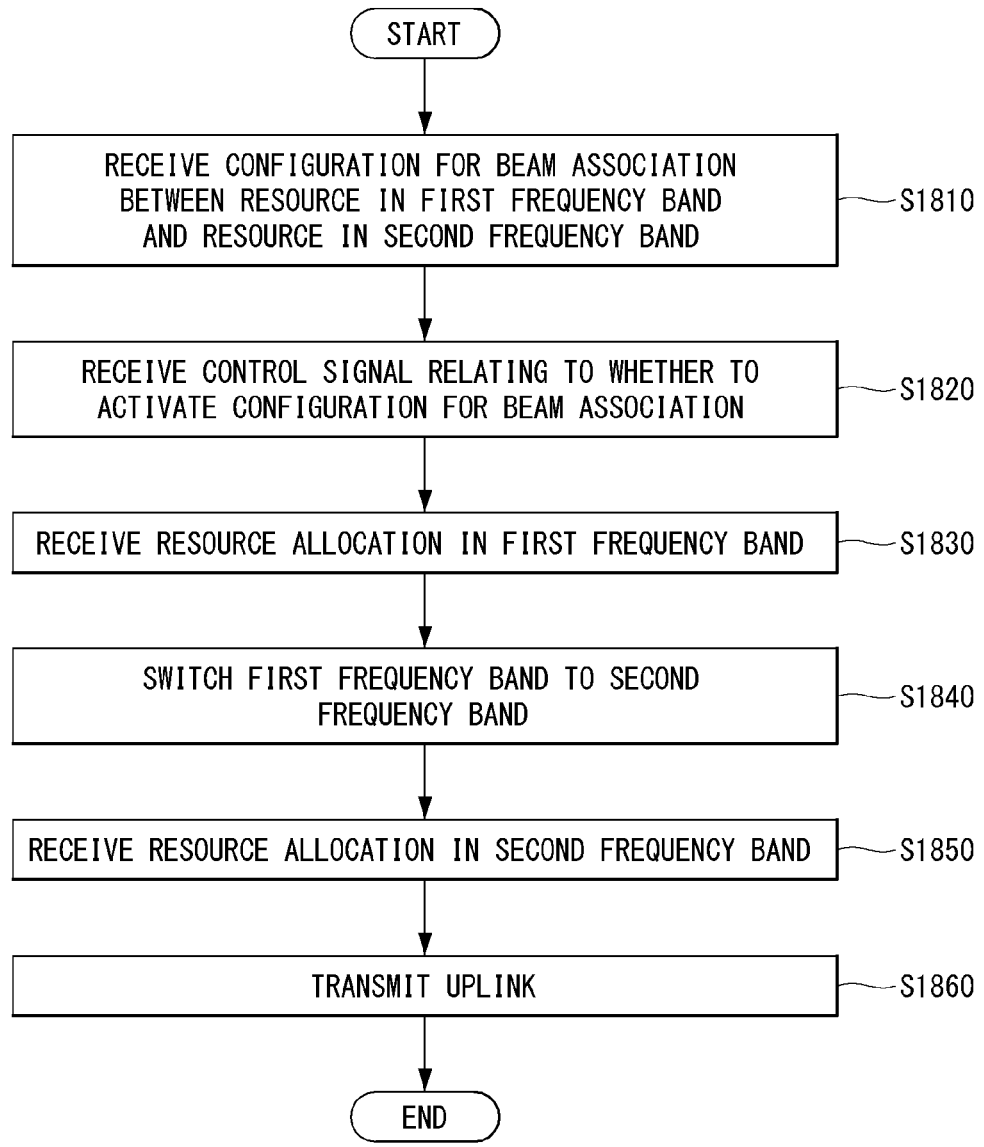
[FIG. 18]

[FIG. 19]
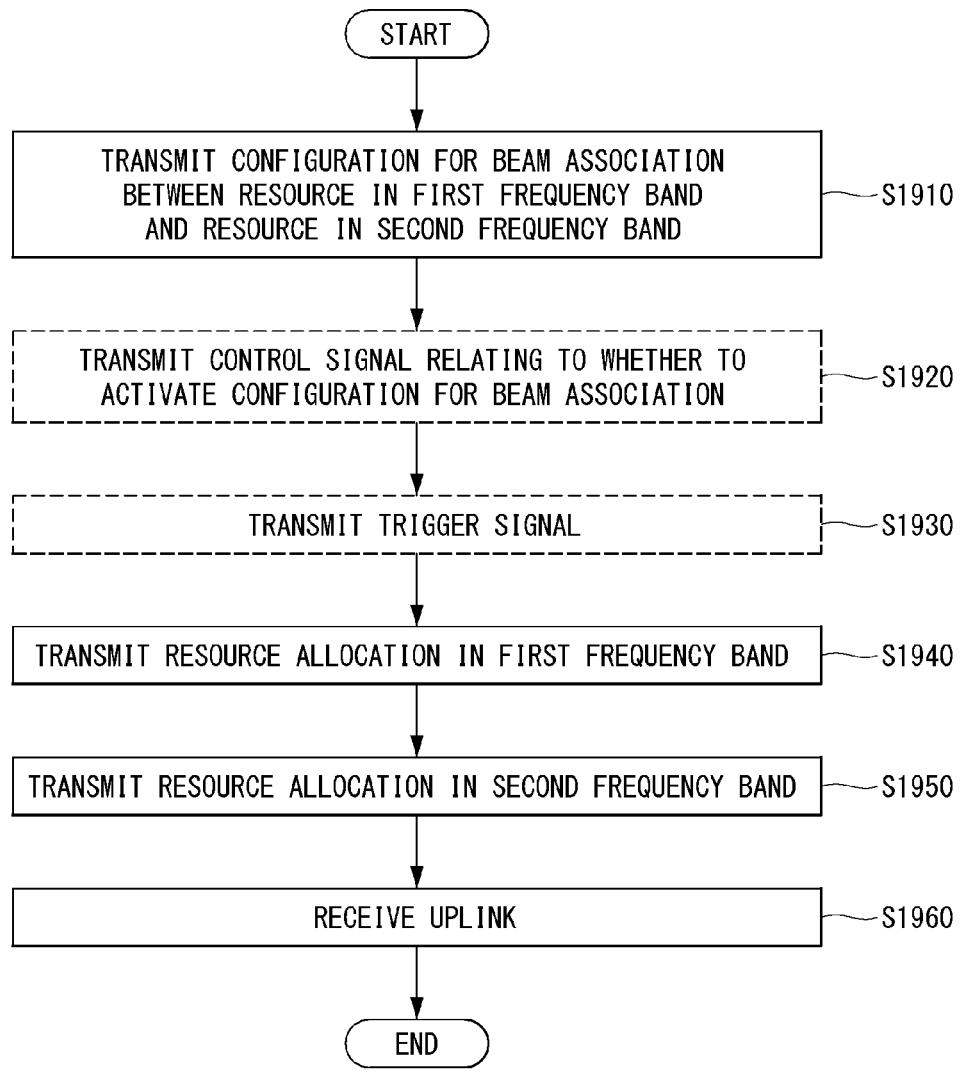
[FIG. 20]
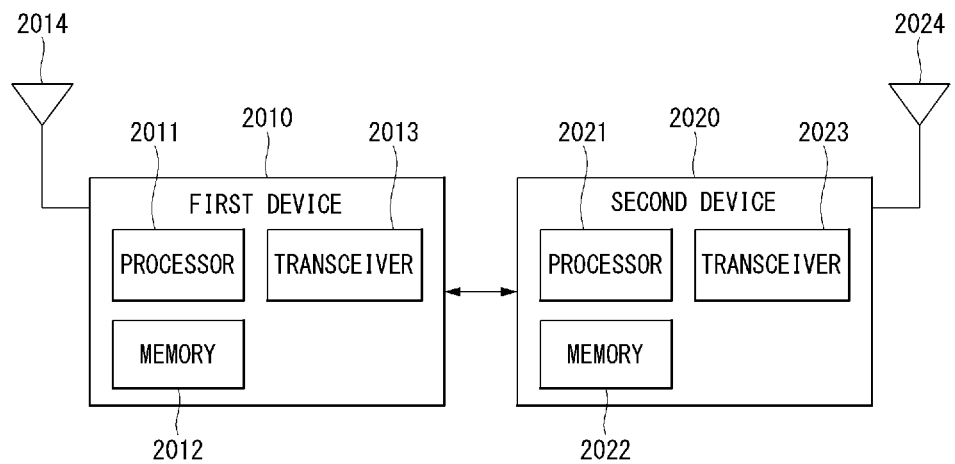

METHOD FOR PERFORMING UPLINK TRANSMISSION IN WIRELESS COMMUNICATION SYSTEM AND DEVICE THEREFOR

This application is the National Stage filing under 35 U.S.C. 371 of International Application No. PCT/KR2019/095013, filed on May 9, 2019, which claims priority to Korean Patent Application No. 10-2018-0052839, filed on May 9, 2018, all the contents of which are hereby incorporated by reference herein in their entirety.

TECHNICAL FIELD

The present disclosure relates to a wireless communication system, and more particularly, to a method for performing uplink transmission involving component carrier (CC) switching and a device supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

An embodiment of the present disclosure provides a method for performing uplink transmission involving component carrier (CC) switching in a wireless communication system.

Specifically, an embodiment of the present disclosure provides a method for configuring a beam association between resource(s) of each CC during component (CC) switching.

In particular, an embodiment of the present disclosure provides a method for configuring a beam association between resource(s) of each CC during CC switching for SRS transmission without a PUSCH and/or PUCCH.

Technical problems to be solved by the disclosure are not limited by the above-mentioned technical problems, and other technical problems which are not mentioned above may be clearly understood from the following description by those skilled in the art to which the disclosure pertains.

Technical Solution

According to an embodiment of the present disclosure, a method for performing, by a user equipment (UE), uplink transmission in a wireless communication system may include: receiving, from a base station, a configuration for a beam association between a resource in a first frequency band and a resource in a second frequency band; receiving, from the base station, allocating the resource in the first frequency band, wherein the first frequency band does not overlap with the second frequency band; switching the first frequency band to the second frequency band; receiving, from the base station, allocating the resource in the second frequency band; and based on the configuration for the beam association, performing the uplink transmission on the resource in the second frequency band.

Furthermore, in the method according to an embodiment of the present disclosure, the configuration for the beam association may be related to i) a beam association between a downlink resource in the first frequency band and an uplink resource in the second frequency band or ii) a beam association between an uplink resource in the first frequency band and the uplink resource in the second frequency band.

Furthermore, in the method according to an embodiment of the present disclosure, the uplink resource in the second frequency band may correspond to a resource in an SRS resource set or the SRS resource set.

Furthermore, in the method according to an embodiment of the present disclosure, the configuration for the beam association may be configured as a beam association between an SSB identification (SSBID) and/or a CSI-RS resource indicator (CRI) of the resource in the first frequency band and an SRS resource indicator (SRI) of the resource in the second frequency band.

Furthermore, in the method according to an embodiment of the present disclosure, a first frequency domain and a second frequency domain may correspond to component carrier (CC) that is different in at least one of a form of beam and/or numerology.

Furthermore, in the method according to an embodiment of the present disclosure, the first frequency domain may be a component carrier (CC) in a frequency band above 6 GHz, and the second frequency domain may be a CC in a frequency band under 6 GHz.

Furthermore, in the method according to an embodiment of the present disclosure, the resource in the second frequency band may correspond to a supplementary uplink (SUL) resource.

Furthermore, in the method according to an embodiment of the present disclosure, the uplink transmission may be sounding reference signal (SRS) transmission without a physical uplink control channel (PUCCH) and/or a physical uplink shared channel (PUSCH).

Furthermore, in the method according to an embodiment of the present disclosure, the configuration for the beam association may be configured through a radio resource control (RRC) or an MAC control element (MAC-CE).

Furthermore, the method according to an embodiment of the present disclosure may further include receiving, from the base station, a control signal relating to whether to activate the configuration for the beam association.

Furthermore, in the method according to an embodiment of the present disclosure, when the configuration for the beam association is disabled based on the control signal, the uplink transmission may be performed based on one QCL relation of i) a QCL relation between uplink and downlink in the first frequency band, ii) a QCL relation between the downlink resource in the first frequency band and the resource in the SRS resource set in the second frequency band, or iii) a QCL relation between the uplink resource in the first frequency band and the SRS resource set in the second frequency band.

Furthermore, in the method according to an embodiment of the present disclosure, when the configuration for the beam association is configured based on a random access channel (RACH) in the second frequency band, the beam association may be configured according to one of i) a beam association between an uplink Tx beam of Message1 (MSG1) of the RACH in the second frequency band and the SRS resource set, ii) a beam association between an uplink Tx beam of Message3 (MSG3) of the RACH in the second frequency band and the SRS resource set, or iii) a beam association between uplink Tx beams of MSG1 and MSG3 in the second frequency band and the SRS resource set.

Furthermore, the method according to an embodiment of the present disclosure may further include receiving, from the base station, a trigger signal relating to whether to apply the configuration for the beam association.

According to an embodiment of the present disclosure, a user equipment (UE) performing uplink transmission in a wireless communication system may include: a Radio Frequency (RF) unit for transmitting/receiving a radio signal; and a processor functionally connected to the RF unit, in which the processor may be configured to receive, from a base station, a configuration for a beam association between a resource in a first frequency band and a resource in a second frequency band, receive, from the base station, a resource allocation in the first frequency band, perform switching from the first frequency band to the second frequency band, receive, from the base station, the resource allocation in the second frequency band, and based on the configuration for the beam association, perform the uplink transmission in the resource in the second frequency band to the base station, and the first frequency band and the second frequency band may not overlap with each other.

According to an embodiment of the present disclosure, a base station receiving uplink transmission of a UE in a wireless communication system may include: a Radio Frequency (RF) unit for transmitting/receiving a radio signal; and a processor functionally connected to the RF unit, in which the processor may be configured to transmit, to the UE, a configuration for a beam association between a resource in a first frequency band and a resource in a second frequency band, transmit, to the UE, a configuration for a beam association between a resource in a first frequency band and a resource in a second frequency band, transmit, to the UE, resource allocation in the second frequency band, and receive, from the UE, the uplink transmission based on the configuration for the beam association, the uplink may be transmitted in the resource in the second frequency band after switching from the first frequency band to the second frequency band, and the first frequency band and the second frequency band may not overlap with each other.

Advantageous Effects

According to an embodiment of the present disclosure, during component carrier switching (hereinafter, referred to as CC switching), a beam association between a resource before the CC switching and a resource to be subjected to the CC switching is configured to quicken a CC switching operation.

Further, according to an embodiment of the present disclosure, a loss of an uplink resource can be minimized through quick CC switching.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 illustrates an example of an overall structure of an NR system to which a method proposed in the disclosure may be applied.

FIG. 2 illustrates the relation between an uplink frame and a downlink frame in a wireless communication system to which a method proposed in the disclosure may be applied.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates one example of a self-contained structure to which a method proposed in the present disclosure may be applied.

FIG. 7 illustrates an example of a switching scenario between BWPs.

FIG. 8 illustrates an example of a transceiver unit model to which a method proposed in the present disclosure may be applied.

FIG. 9 is a diagram illustrating an example for a hybrid beamforming structure in terms of a TXRU and a physical antenna.

FIG. 10 illustrates an example of a beam sweeping operation for a synchronization signal and system information.

FIG. 11 illustrates an example of a UL BM procedure using an SRS.

FIG. 12 is a flowchart showing an example of a UL BM procedure using the SRS.

FIG. 13 illustrates an example of a method for obtaining downlink channel state information (CSI) by using reciprocity of uplink and downlink.

FIG. 14 illustrates an example of Tx beam mismatch in NR UL and SUL.

FIG. 15 illustrates an example showing an uplink transmission disabling area which occurs during CC switching.

FIG. 16 illustrates an example showing that the SUL is additionally configured.

FIG. 17 illustrates an example of an operation flowchart of a user equipment (UE) performing uplink transmission to which an embedment proposed in the present disclosure may be applied.

FIG. 18 illustrates another example of the operation flowchart of the UE performing uplink transmission to which an embedment proposed in the present disclosure may be applied.

FIG. 19 illustrates an example of an operation flowchart of a base station (BS) receiving uplink transmission in a wireless communication system to which a method proposed in the present disclosure may be applied.

FIG. 20 is a block diagram of a wireless communication device to which methods proposed in the present disclosure may be applied.

MODE FOR INVENTION

Figure 3:
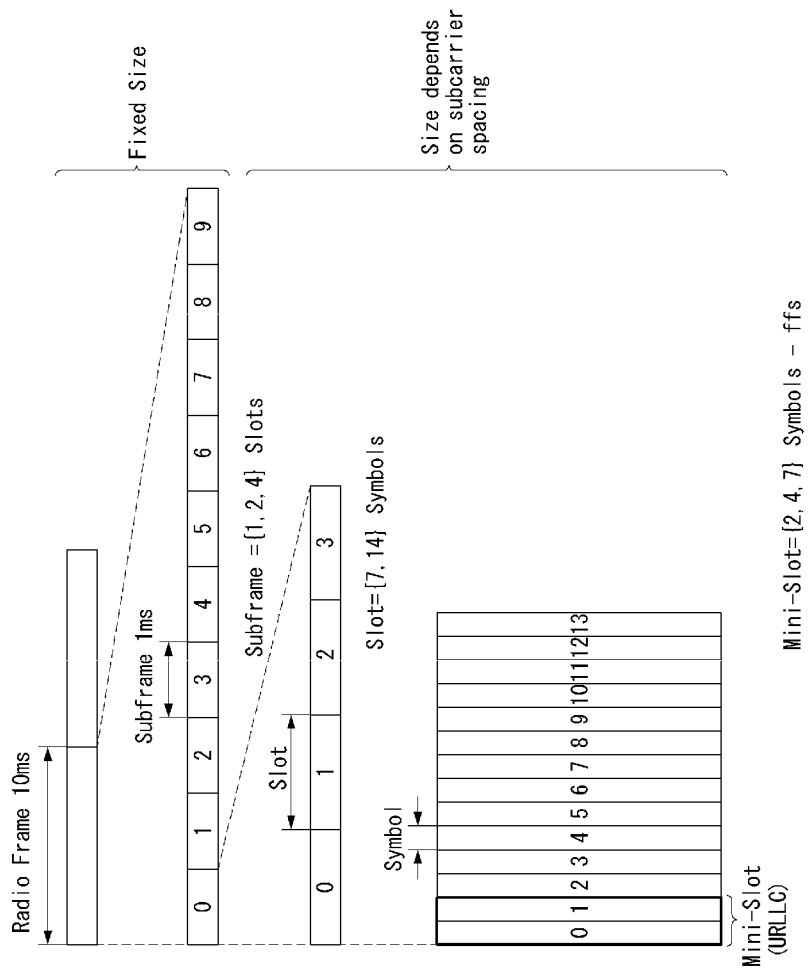
FIG. 3 illustrates an example of a frame structure in an NR system.

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal may be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE 36.211: Physical channels and modulation 36.212: Multiplexing and channel coding 36.213: Physical layer procedures 36.300: Overall description 36.331: Radio Resource Control (RRC)

3GPP NR 38.211: Physical channels and modulation 38.212: Multiplexing and channel coding 38.213: Physical layer procedures for control 38.214: Physical layer procedures for data 38.300: NR and NG-RAN Overall Description 36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system to which a method proposed in the disclosure may be applied.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defied by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates the relation between an uplink frame and a downlink frame in a wireless communication system to which a method proposed in the disclosure may be applied.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology µ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 2 represents the number $N_{symb}^{slot}$ of OFDM symbols per slot, the number $N_{slot}^{frame,\mu}$ of slots per radio frame, and the number $N_{slot}^{subframe, \mu}$ of slots per subframe in a normal CP. Table 3 represents the number of OFDM symbols per slot, the number of slots per radio frame, and the number of slots per subframe in an extended CP.

TABLE 2

| µ | $N_{symb}^{slot}$ | $N_{slot}^{frame, \mu}$ | $N_{slot}^{subframe, \mu}$ |
| --- | --- | --- | --- |
| 0 | 14 | 10 | 1 |
| 1 | 14 | 20 | 2 |

TABLE 2-continued

| μ | $N_{symb}^{slot}$ | $N_{slot}^{frame, \mu}$ | $N_{slot}^{subframe, \mu}$ |
|---|---|---|---|
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 3, in case of μ=2, i.e., as an example in which a subcarrier spacing (SCS) is 60 kHz, one subframe (or frame) may include four slots with reference to Table 2, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In relation to physical resources in the NR system, an antenna port, a resource grid, a resource element, a resource block, a carrier part, etc., may be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 4 illustrates an example of a resource grid supported in a wireless communication system to which a method proposed in the disclosure may be applied.

Referring to FIG. 4, a resource grid consists of $N_{RB}^{\mu} N_{sc}^{RB}$ subcarriers on a frequency domain, each subframe consisting of 14·2$^{\mu}$ OFDM symbols, but the disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄), where k=0, . . . , $N_{RB}^{\mu} N_{sc}^{RB}-1$ is an index on a frequency domain, and l̄=0, . . . , $2^{\mu} N_{symb}^{(\mu)}-1$ refers to a location of a symbol in a subframe. The index pair (k,l) is used to refer to a resource element in a slot, where l=0, . . . , $N_{symb}^{\mu}-1$.

The resource element (k,l̄) for the numerology μ and the antenna port p corresponds to a complex value $a_{k,l̄}^{(p,\mu)}$. When there is no risk for confusion or when a specific antenna port or numerology is not specified, the indexes p and μ may be dropped, and as a result, the complex value may be $a_{k,l̄}^{(p)}$ or $a_{k,l̄}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Meanwhile, a PRB grid of each numerology supported by the carrier, a BWP configuration (supporting a maximum of four BWPs) in the carrier of each DL/UL, a code block group (CBG) configuration, a transmission power control (TPC) per cell group, an HARQ process, a scrambling/sequence related parameter, etc., may be configured in a carrier level. A control resource set (configured per cell, but associated per BWP), a parameter and DRM-RS configuration related to resource allocation, a CRI-RS related parameter, an SRS resource set, an HARQ-ACK and a schedule request (SRS) resource, a configured UL grant, etc., may be configured in a BWP level.

Self-Contained Structure

A time division duplexing (TDD) structure taken into consideration in an NR system is a structure in which both uplink (UL) and downlink (DL) are processed in one slot (or subframe). This is for minimizing latency of data transmission in the TDD system. The structure may be referred to as a self-contained structure or a self-contained slot.

FIG. 6 shows an example of a self-contained structure according to some implementations of this disclosure. FIG.

6 is merely for convenience of description and does not limit the scope of the present disclosure.

Referring to FIG. 6, as in the case of legacy LTE, a case where one transmission unit (e.g., slot, subframe) is configured with 14 orthogonal frequency division multiplexing (OFDM) symbols is assumed.

In FIG. 6, a region 602 means a downlink control region, and a region 604 means an uplink control region. Furthermore, regions (i.e., regions not having separate indication) except the region 602 and the region 604 may be used for the transmission of downlink data or uplink data.

That is, uplink control information and downlink control information may be transmitted in one self-contained slot. In contrast, in the case of data, uplink data or downlink data may be transmitted in one self-contained slot.

If the structure shown in FIG. 6 is used, downlink transmission and uplink transmission are sequentially performed and the transmission of downlink data and the reception of uplink ACK/NACK may be performed within one self-contained slot.

Consequently, when an error occurs in data transmission, the time consumed up to the retransmission of data can be reduced. Accordingly, latency related to data forwarding can be minimized.

In a self-contained slot structure, such as FIG. 6, there is a need for a time gap for a process of a base station (eNodeB, eNB, gNB) and/or a terminal (user equipment (UE)) changing from a transmission mode to a reception mode or of the base station and/or the terminal changing from a reception mode to a transmission mode. In relation to the time gap, when uplink transmission is performed after downlink transmission in a self-contained slot, some OFDM symbol(s) may be configured as a guard period (GP).

Bandwidth Part (BWP)

An NR system may be supported up to a maximum of 400 MHz per one component carrier (CC). If a terminal operating in such a wideband CC operates with its RF for all CCs being turned on, terminal battery consumption may be increased. Alternatively, if several use cases (e.g., eMBB, URLLC, Mmtc, V2X) operating within one wideband CC are taken into consideration, a different numerology (e.g., sub-carrier spacing) for each frequency band within the corresponding CC may be supported. Alternatively, the capability of a maximum bandwidth may be different for each terminal. A base station may indicate that the terminal operates only in some bandwidth not the full bandwidth of the wideband CC by taking the capacity into consideration. The corresponding some bandwidth is defined as a bandwidth part (BWP), for convenience sake. The BWP may be configured with resource blocks (RBs) contiguous on a frequency axis, and may correspond to one numerology (e.g., sub-carrier spacing, CP length, slot/mini-slot duration).

Meanwhile, a base station may configure multiple BWPs within one CC configure in a terminal. For example, in a PDCCH monitoring slot, a BWP occupying a relatively small frequency domain may be configured, and a PDSCH indicated in a PDCCH may be scheduled on a BWP greater than the configured BWP. Alternatively, if UEs are crowded in a specific BWP, some UEs may be configured in other BWP for load balancing. Alternatively, some spectrum at the center of a full bandwidth may be excluded by taking into consideration frequency domain inter-cell interference cancellation between neighbor cells, and BWPs on both sides may be configured in the same slot. That is, the base station may configure at least one DL/UL BWP in a terminal associated with a wideband CC, may activate at least one DL/UL BWP of DL/UL BWP(s) (by L1 signaling or MAC CE or RRC signaling) configured in a specific time. Switching to another configured DL/UL BWP (by L1 signaling or MAC CE or RRC signaling) may be indicated or switching to a predetermined DL/UL BWP may be performed when a timer value expires based on a timer.

In this case, the activated DL/UL BWP is defined as an active DL/UL BWP. One UE may support one active DL BWP at one time for a DL carrier in the cell. Further, the UE may support a maximum of one active UL BWP in UL, UL and SUL, or only SUL according to whether to configure the SUL. Specifically, when the SUL is not configured, a maximum of one active UL BWP may be configured in the UL carrier corresponding to the DL carrier. Alternatively, when dynamically switched SUL is configured, a maximum of one active UL BWP may be configured in each UL and SUL. Alternatively, when only the SUL is used, a maximum of one active UL BWP may be configured in the SUL carrier. The UE may expect that both the DL BWP and the UL BWP simultaneously correspond to the same numerology in a given cell except for the UL BWP of the SUL carrier. The SUL carrier may support a different numerology from the DL carrier in the cell and support a numerology equal to or smaller than the numerology of the DL carrier.

However, if a terminal is in an initial access process or in a situation before an RRC connection is set up, the terminal may not receive a configuration for a DL/UL BWP. In such a situation, a DL/UL BWP assumed by the terminal is defined as an initial active DL/UL BWP.

BWP Switching Latency

As described above, multiple BWPs may be configured in one CC and switching (or selection) between the BWPs may be performed. FIG. 7 illustrates an example of a switching scenario between the BWPs and Table 4 illustrates a latency which occurs during BWP switching for each scenario. Referring to FIG. 7, scenario 1 shows a latency when a carrier frequency is moved in a situation in which the numerology is the same. Scenario 2 shows a latency which occurs when the numerology is extended or a bandwidth is extended. Scenario 3 shows a latency which occurs when the numerology is changed and the bandwidth is extended. Scenario 4 shows a latency when previously configured numerology is used again at a specific time. Referring to FIG. 7 and Table 4, there may be BWP switching in various cases and a latency according to switching for each case.

TABLE 4

| Frequency Range | Scenario | Type 1 Delay (us) | Type 2 Delay (us) |
|---|---|---|---|
| 1 | 1 | 600 | 2000 |
|   | 2 | 600 | 2000 |
|   | 3 | 600 | 2000 |
|   | 4 | 400 | 950 |
| 2 | 1 | 600 | 2000 |
|   | 2 | 600 | 2000 |
|   | 3 | 600 | 2000 |
|   | 4 | 400 | 950 |

SRS Transmission in NR System

In the NR system, a sequence of the SRS for the SRS resource may be generated according to Equation 3 below.

$$r^{(p_i)}(n,l') = r_{u,v}^{(\alpha_i, \delta)}(n)$$

$$0 \leq n \leq 271 \cdot N_{sc}^{RB}/K_{TC}$$

$$l' \in \{0, 1, \ldots, N_{symb}^{SRS}-1\} \quad \text{[Equation 3]}$$

In Equation 3, $r_{u,v}^{(\alpha_i,\delta)}(n)$ represents a sequence configured by a sequence number v and a sequence group u of the SR and a transmission comb (TC) number K_TC($K_{TC}$) may be included in SRS-TransmissionComb which is a higher layer parameter.

Further, cyclic shift (SC) $\alpha_i$ for antenna port $p_i$ may be given as shown in Equation 4 below.

$$\alpha_i = 2\pi \frac{n_{SRS}^{cs,i}}{n_{SRS}^{cs,max}}$$

$$n_{SRS}^{cs,i} = \left(n_{SRS}^{cs} + \frac{n_{SRS}^{cs,max} p_i}{N_{ap}}\right) \bmod n_{SRS}^{cs,max}$$

[Equation 4]

In Equation 4, $n_{SRS}^{cs} \in \{0, 1, \ldots, n_{SRS}^{cs,max}\}$ may be given by higher layer parameter SRS-CyclicShiftConfig. Furthermore, a maximum number of the cyclic shift is 12 (i.e., $n_{SRS}^{cs,max}=12$) when K_TC is 4 and 8 (i.e., $n_{SRS}^{cs,max}=8$) when K_TC is 2.

The sequence group u (u=($f_{gh}(n_{s,f}^\mu,l')+n_{ID}^{SRS}$ mod 30)mod 30) and the sequence number u may follow higher layer parameter SRS-GroupSequenceHopping. Further, an SRS sequence identifier $n_{ID}^{SRS}$ may be given by higher layer parameter SRS-SequenceId. l' (i.e., l'∈{0,1, ..., $N_{symb}^{SRS}-1$}) represents an OFDM symbol number in the corresponding SRS resource.

In this case, when a value of SRS-GroupSequenceHopping is 0, group hopping and sequence hopping may not be used and this may be expressed as shown in Equation 5 below.

$$f_{gh}(n_{s,f}^\mu,l')=0$$

$$v=0$$

[Equation 5]

In Equation 5, f_gh(x, y) represents sequence group hopping and v represents the sequence hopping.

Alternatively, when the value of SRS-GroupSequence-Hopping is 1, not the sequence hopping but the group hopping may be used and this may be expressed as shown in Equation 6 below.

$$f_{gh}(n_{s,f},l')=(\Sigma_{m=0}^{7}c(8(n_{s,f}^\mu N_{symb}^{SRS}+l')+m)\cdot 2^m)\bmod 30$$

$$v=0$$

[Equation 6]

In Equation 6, f_gh(x, y) represents the sequence group hopping and v represents the sequence hopping. Furthermore, c(i) may represent a pseudo-random sequence and may be initialized to $c_{init}=\lfloor n_{ID}^{SRS}/30 \rfloor$ in a start of each radio frame.

Alternatively, when the value of SRS-GroupSequence-Hopping is 2, not the group hopping but the sequence hopping may be used and this may be expressed as shown in Equation 7 below.

$$f_{gh}(n_{s,f},l')=0$$

$$v = \begin{cases} c(n_{s,f}N_{symb}^{SRS}+l') & M_{sc,b}^{SRS} \geq 3N_{sc}^{RB} \\ 0 & \text{otherwise} \end{cases}$$

[Equation 7]

In Equation 7, f_gh(x, y) represents the sequence group hopping and v represents the sequence hopping. Furthermore, c(i) may represent the pseudo-random sequence and may be initialized to $c_{init}=\lfloor n_{ID}^{SRS}/30 \rfloor \cdot 2^5+(n_{ID}^{SRS}+\Delta_{ss})\bmod 30$ in the start of each radio frame (here, $\Delta_{ss}\in\{0,1,\ldots,29\}$).

Group Common (GC) PDCCH

Table 5 shows an example of a DCI format in the NR system.

TABLE 5

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

Referring to Table 5, DCI format 0_0 is used for scheduling of the PUSCH in one cell. Information included in DCI format 0_0 is CRC-scrambled and transmitted by C-RNTI, CS-RNTI, or MCS-C-RNTI.

In addition, DCI format 0_1 is used for reserving the PUSCH in one cell. Information included in DCI format 0_1 is CRC-scrambled and transmitted by C-RNTI, CS-RNTI, SP-CSI-RNTI, or MCS-C-RNTI.

DCI format 1_0 is used for scheduling of the PDSCH in one DL cell. Information included in DCI format 1_0 is CRC-scrambled and transmitted by C-RNTI, CS-RNTI, or MCS-C-RNTI.

DCI format 1_1 is used for scheduling of the PDSCH in one cell. Information included in DCI format 1_1 is CRC-scrambled and transmitted by C-RNTI, CS-RNTI, or MCS-C-RNTI.

DCI format 2_0 is used for notifying a group of UEs of a slot format and is scrambled by SFI-RNTI. GC PDCCH refers to DPCCH commonly delivered to the group, which is defined according to a predetermined criterion. Here, the group may be configured through the SFI-RNTI and may include a non-scheduled UE and a scheduled UE, and the UEs may be in a state of being RRC-connected. The UE may receive configuring whether the UE should receive the GC PDCCH separately through RRC. Information delivered to the group through the GC PDCCH may include dynamic slot format related information (SFI). The SFI may be a signal separated from a control signal commonly delivered to the group and the GC PDCCH in this case corresponds to a channel for delivering the only dynamic SFI. UE-specific SFI which each UE in the group may have may be pre-defined by a table and the dynamic SFI of the GC PDCCH may be configured by a scheme of notifying an index of the table.

DCI format 2_1 is used for notifying a group of UEs of the PRB(s) and OFDM symbol(s) which the UE assumes not to transmit under an intention thereof.

DCI format 2_2 is used for transmitting a Transmit Power Control (TPC) command for the PUCCH and the PUSCH.

DCI format 2_3 is used for transmitting a group of TPC commands for SRS transmission by one or more UEs. Further, DCI format 2_3 may be used for transmitting an SRS request. The UE may receive configuring the TPC commands group depending on the SRS transmission which occurs during the SRS switching to the GC-PDCCH through an SRS-carrierswitching parameter configured by the higher layer (RRC). Here, the group may be configured through TPC-SRS-RNTI. The information delivered to the group through the GD PDCCH may include an identifier for notifying a DCI format configured by 1 bit. Alternatively, the information may include a block number, etc., and a start position of the block may be determined by startingBitOfFormat2-3 which is a parameter provided by the higher layer for a UE configured by the block.

In the case of srs-TPC-PDCCH-Group=typeA for uplink without the PUSCH and/or PUCCH in the RRC configuration or in the case where an SRS power control does not match a PUSCH power control SRS request: may be configured by 0 or 2 bits.

TPC command number 1, TPC command number 2, . . . , TPC command number N: Each TPC command may be applied to each uplink carrier provided by a higher layer parameter cc-IndexInOneCC-Set.

For higher measurement parameter type A, an index for a set of serving cells may be provided by the higher layer parameter cc-SetIndex and the index for the serving cell in the set of the serving cells may be provided by the higher layer parameter cc-IndexInOneCC-Set. DCI format 2-3 may include the TPC command for each serving cell from the set of the serving cells and further include the SRS request for the SRS transmission on the set (set of CCs) of the serving cells.

In the case of srs-TPC-PDCCH-Group=typeB for the uplink without the PUSCH and/or PUCCH in the RRC configuration or in the case where the SRS power control does not match the PUSCH power control SRS request: may be configured by 0 or 2 bits.

The TPC command may be configured by 2 bits.

For higher measurement parameter type B, DCI format 2-3 may include the TPC command for the index of the serving cell. Furthermore, the DCI format 2-3 may include the SRS request for the SRS transmission of the serving cell, and the index of the serving cell for the SRS transmission and mapping with DCI format 2-3 may be provided by srs-CellToSFI which is the higher layer parameter.

That is, srs-pcadjustment-state-config is configured for serving cells specified by separating the power control between the SRS transmission and the PUSCH transmission or serving cells with a UE without the PUSCH and/or PUCCH transmission by DCI format 2-3.

The SRS transmission may have a time gap according to rf-RetuningTimeUL and rf-RetuningTimeDL per CC. An order of the SRS transmission triggered in the serving cells may follow an order of serving cells in an indicated set of the serving cell configured by the higher layer.

Enhanced Mobile Broadband Communication (eMBB)

In the case of the NR system, a massive MIMO environment in which the number of transmission/reception antennas greatly increases may be considered. That is, as a large MIMO environment is considered, the number of the transmission/reception antennas may increase to several tens or several hundreds. A hybrid type beamforming technique in which an analog beamforming technique and a digital beamforming technique are combined is required according to a position to which a beamforming weight vector/precoding vector is applied in order to reduce complexity of hardware implementation in the large MIMO environment and for an increase in performance using multiple antennas, flexibility of resource allocation, and ease of beam control for each frequency.

Analog Beamforming

In millimeter wave (mmW), the wavelength is shortened, so it is possible to install multiple antenna elements in the same area. That is, in a 30 GHz band, the wavelength is 1 cm, and a total of 64 (8×8) antenna elements may be installed in a 2-dimensional array at 0.5 lambda (i.e., wavelength) intervals on a 4×4 (4 by 4) cm panel. Installation is possible. Therefore, in mmW, coverage may be increased by increasing a beamforming (BF) gain or throughput may be increased using multiple antenna elements.

In this case, if a transceiver unit (TXRU) is provided to enable transmission power and phase adjustment for each antenna element, it may be possible to independently perform beamforming for each frequency resource. However, installing TXRUs on all of the 100 antenna elements has a problem of deteriorated effectiveness in terms of price. Therefore, a method of mapping multiple antenna elements to one TXRU and adjusting a direction of a beam with an analog phase shifter is considered. This analog BF method has a disadvantage in that it cannot perform frequency selective BF because only one beam direction may be made in the entire band.

Hybrid BF having B TXRUs which is a number smaller than Q antenna elements may be considered as an intermediate form between digital BF and analog BF. In this case, although there is a difference depending on a connection method of the B TXRUs and Q antenna elements, directions of beams that may be simultaneously transmitted are limited to B or less.

Hereinafter, typical examples of a method for connecting TXRUs and antenna elements will be described with reference to the drawings.

FIG. 8 illustrates a transceiver unit model in a wireless communication system to which the present disclosure may be applied.

A TXRU virtualization model represents a relationship between output signals of TXRUs and output signals of the antenna elements. The TXRU virtualization model may be classified into TXRU virtualization model option—1: sub-array partition model as shown in FIG. 8(a) and a TXRU virtualization model option—2: full-connection model as shown in FIG. 8(b) according to correlations between antenna elements and TXRUs.

Referring to FIG. 8(a), in the case of the sub-array partition model, antenna elements are divided into multiple antenna element groups, and each TXRU is connected to one of the groups. In this case, the antenna elements are connected to only one TXRU.

Referring to FIG. 8(b), in the case of the full-connection model, signals of multiple TXRUs are combined and transferred to a single antenna element (or array of antenna elements). That is, it shows a method in which the TXRUs are connected to all antenna elements. In this case, the antenna elements are connected to all TXRUs.

In FIG. 8, q denotes a transmission signal vector of M co-polarized antenna elements in one column. w denotes a wideband TXRU virtualization weight vector, and W denotes a phase vector multiplied by an analog phase shifter. That is, a direction of analog beamforming is determined by W. x is a signal vector of M TXRU TXRUs.

Here, mapping between the antenna ports and the TXRUs may be one-to-one (1-to-1) or one-to-many (1-to-many).

In FIG. 8, the TXRU-to-element mapping between the TXRUs and the antenna elements is merely an example, and the present disclosure is not limited thereto. The present disclosure may be applied equally to mapping between TXRUs and antenna elements that may be implemented in various other forms from a hardware perspective.

Hybrid Beamforming

In the New RAT system, in the case of using multiple antennas, a hybrid beamforming technique combining digital beamforming and analog beamforming has been considered.

In this case, analog beamforming (or radio frequency (RF) beamforming) refers to an operation of performing precoding (or combining) at an RF stage. In hybrid beamforming, a baseband stage and the RF stage each perform precoding (or combining), whereby performance close to digital beamforming may be obtained, while reducing the number of RF chains and D(digital)/A(analog) (or A/D) converters.

The hybrid beamforming structure may be represented by N transceiver units (TXRUs) and M physical antennas. Then, digital beamforming for the L data layers to be transmitted from a transmitter may be expressed as an N by L (N×L) matrix, and the converted N digital signals are then converted to analog signals through the TXRUs and then analog beamforming expressed as an M by N (M×N) matrix is applied.

FIG. 9 illustrates a hybrid beamforming structure in terms of TXRUs and physical antennas.

Referring to FIG. 9, a case where the number of digital beams is L and the number of analog beams is N is assumed.

In the NR system, a direction for supporting more efficient beamforming to a user equipment (UE) located in a specific area is considered by designing a base station to change analog beamforming in units of symbols. Further, when specific N TXRUs and M RF antennas are defined as one antenna panel in FIG. 9, in the NR system, even a method of introducing a plurality of antenna panels to which applying independent hybrid beamforming may be applicable is considered.

As mentioned above, when a BS uses a plurality of analog beams, analog beams advantageous for signal reception may be different for each UE, and thus, a beam sweeping operation in which a plurality of analog beams to be applied by the BS in a specific subframe is changed according to symbols so that all UEs may have a reception opportunity is considered for at least a synchronization signal, system information, paging, and the like.

FIG. 10 shows an example of a beam sweeping operation for a synchronization signal and system information.

Referring to FIG. 10, beam sweeping for the synchronization signal and the system information during a downlink transmission process may be assumed and a physical resource (or physical channel) in which the system information of the NR system is transmitted by a broadcasting scheme may be referred to as x-Physical Broadcast Channel (xPBCH).

In this case, analog beams belonging to different antenna panels within one symbol may be simultaneously transmitted, and a method of adopting a beam reference signal (BRS) which is a reference signal transmitted by applying a single analog beam (corresponding to a specific antenna panel) as shown in FIG. 10 to measure a channel in accordance with an analog beam has been discussed.

Here, the BRS may be defined for a plurality of antenna ports, and each antenna port of the BRS may correspond to a single analog beam. In this case, unlike the BRS, the synchronization signal or xPBCH may be transmitted, to which all of the analog beams in the analog beam group are applied so as to be well received by random UEs.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The UL BM procedure using a sounding reference signal (SRS) may be performed as follows.

In the case of UL BM, beam reciprocity (or beam correspondence) between the Tx beam and the Rx beam may be established or not established according to UE implementation. If the reciprocity between the Tx beam and the Tx beam is established in both the eNB and the UE, a UL beam pair may be matched through a DL beam pair. However, when the reciprocity between the Tx beam and the Rx beam is not established even in any one of the eNB and the UE, a UL beam pair determination process is required apart form DL beam pair determination.

Further, even when the eNB and the UE maintain beam correspondence, the eNB may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K (≥1) SRS resources (higher later parameter SRS-resources). Here, K is a natural number and a maximum value of K is indicated by SRS_capability.

Similarly to the DL BM, a UL BM procedure may also be divided into Tx beam sweeping of the UE and Rx beam sweeping of the eNB.

FIG. 11 illustrates an example of an uplink beam management procedure using a Sounding Reference Signal (SRS).

FIG. 11(a) illustrates an Rx beam determination procedure of the eNB and FIG. 11(b) illustrates a Tx beam sweeping procedure of the UE.

FIG. 12 is a flowchart showing an example of an uplink beam management procedure using the SRS.

The UE receives, from the eNB, RRC signaling (e.g., SRS-Config IE) including a (higher layer parameter) usage parameter configured as 'beam management' (S12010).

Table 6 shows an example of SRS-Config Information Element (IE) and SRS-Config IE is used for an SRS transmission configuration. SRS-Config IE includes a list of SRS-Resources and a list of SRS-ResourceSets. Each SRS resource set means a set of SRS-resources.

The network may trigger transmission of the SRS resource set by using configured aperiodicSRS-Resource-Trigger (L1 DCI).

TABLE 6

```
-- ASN1START
-- TAG-MAC-CELL-GROUP-CONFIG-START
SRS-Config ::=                           SEQUENCE {
    srs-ResourceSetToReleaseList             SEQUENCE (SIZE(1..maxNrofSRS-ResourceSets)) OF
SRS-ResourceSetId             OPTIONAL,  -- Need N
    srs-ResourceSetToAddModList              SEQUENCE (SIZE(1..maxNrofSRS-ResourceSets)) OF SRS-
ResourceSet                   OPTIONAL,  -- Need N
    srs-ResourceToReleaseList                SEQUENCE (SIZE(1..maxNrofSRS-Resources)) OF SRS-
ResourceId                    OPTIONAL,  -- Need N
    srs-ResourceToAddModList                 SEQUENCE (SIZE(1..maxNrofSRS-Resources)) OF SRS-
Resource                      OPTIONAL,  -- Need N
    tpc-Accumulation                         ENUMERATED {disabled}
    ...
}
SRS-ResourceSet ::=                      SEQUENCE {
    srs-ResourceSetId                        SRS-ResourceSetId,
    srs-ResourceIdList                       SEQUENCE (SIZE(1..maxNrofSRS-ResourcesPerSet)) OF
SRS-ResourceId   OPTIONAL,    -- Cond Setup
    resourceType                             CHOICE {
        aperiodic                                SEQUENCE {
            aperiodicSRS-ResourceTrigger             INTEGER (1..maxNrofSRS-TriggerStates-
1),
            csi-RS                                   NZP-CSI-RS-ResourceId
            slotOffset                               INTEGER (1..32)
            ...
        },
        semi-persistent                          SEQUENCE {
            associatedCSI-RS                         NZP-CSI-RS-ResourceId
            ...
        },
        periodic                                 SEQUENCE {
            associatedCSI-RS                         NZP-CSI-RS-ResourceId
            ...
        }
    },
    usage                                    ENUMERATED       {beamManagement,    codebook,
nonCodebook, antennaSwitching},
    alpha                                    Alpha
    p0                                       INTEGER (-202..24)
    pathlossReferenceRS                      CHOICE {
        ssb-Index                                SSB-Index,
        csi-RS-Index                             NZP-CSI-RS-ResourceId
SRS-SpatialRelationInfo ::=              SEQUENCE {
    servingCellId                            ServCellIndex
OPTIONAL, -- Need S
    referenceSignal                          CHOICE {
        ssb-Index                                SSB-Index,
        csi-RS-Index                             NZP-CSI-RS-ResourceId,
        srs                                      SEQUENCE {
            resourceId                               SRS-ResourceId,
            uplinkBWP                                BWP-Id
        }
    }
}
}
SRS-ResourceId ::=                       INTEGER (0..maxNrofSRS-Resources-1)
```

In Table 6, usage represents a higher layer parameter indicating whether the SRS resource set is used for the beam management or whether the SRS resource set is used for codebook based or non-codebook based transmission. The usage parameter corresponds to L1 parameter 'SRS-SetUse'. 'spatialRelationInfo' is a parameter representing a configuration of a spatial relation between a reference RS and a target SRS. Here, the reference RS may become SSB, CSI-RS, or SRS corresponding to L1 parameter 'SRS-SpatialRelationInfo'. The usage is configured for each SRS resource set.

The UE determines a Tx beam for an SRS resource to be transmitted based on SRS-SpatialRelation Info included in the SRS-Config IE (S1220). Here, SRS-SpatialRelation Info is configured for each SRS resource and represents a beam which is the same as the beam used in the SSB, the CSI-RS, or the SRS is to be applied for each SRS resource. Further, SRS-SpatialRelationInfo may be configured or not configured in each SRS resource.

If SRS-SpatialRelationInfo is configured in the SRS resource, SRS-SpatialRelationInfo is transmitted by applying the beam which is the same as the beam used in the SSB, the CSI-RS, or the SRS. However, if SRS-SpatialRelationInfo is not configured in the SRS resource, the UE arbitrarily determines the Tx beam and transmits the SRS through the determined Tx beam (S1230).

More specifically, for P-SRS in which 'SRS-ResourceConfigType' is configured as 'periodic':

i) When SRS-SpatialRelationInfo is configured as 'SSB/PBCH', the UE transmits the corresponding SRS resource by applying a spatial domain transmission filter which is the same as a spatial domain Rx filter used for receiving the SSB/PBCH (or generated from the corresponding filter); or ii) When SRS-SpatialRelationInfo is configured as 'CSI-RS', the UE transmits the SRS resource by applying the same spatial domain transmission filter used for receiving periodic CSI-RS or SP CSI-RS; or iii) When SRS-SpatialRelationInfo is configured as 'SRS', the UE transmits the SRS resource by applying the same spatial domain transmission filter used for transmitting the periodic CSI-RS.

Even when 'SRS-ResourceConfigType' is configured as 'SP-SRS' or 'AP-SRS', beam determination and transmission operations may be applied similarly thereto.

Additionally, the UE may receive or not receive a feedback for the SRS from the eNB like three following cases (S1240).

i) When Spatial_Relation_Info is configured for all SRS resources in the SRS resource set, the UE transmits the SRS with the beam indicated by the eNB. For example, when all Spatial_Relation_Info indicates the same SSB, CRI, or SRI, the UE repeatedly transmits the SRS with the same beam. This case as a usage of selecting the Rx beam by the eNB corresponds to FIG. 11(a).

ii) Spatial_Relation_Info may not be configured for all SRS resources in the SRS resource set. In this case, the UE may transmit the SRS while arbitrarily changing the SRS beam. In other words, this case as a usage of selecting the Tx beam by the UE corresponds to FIG. 11(b).

iii) Spatial_Relation_Info may be configured for some SRS resources in the SRS resource set. In this case, the SRS may be transmitted with the beam configured for the configured SRS resource and the UE may arbitrarily transmit the SRS by applying the Tx beam to an SRS resource in which Spatial_Relation_Info is not configured.

QCL (Quasi-Co Location)

The antenna port is defined so that a channel in which the symbol on the antenna port is transported may be inferred from a channel in which different symbols on the same antenna port are transported. When a property of a channel in which a symbol on one antenna port is transported may be interred from a channel in which symbols on different antenna ports are transported, two antenna ports may have a quasi co-located or quasi co-location (QC/QCL) relationship.

Here, the channel property includes at least one of a delay spread, a Doppler spread, a frequency/Doppler shift, average received power, received timing/average delay, and a spatial Rx parameter. Here, the spatial Rx parameter means a spatial (receive) channel property parameter such as angle of arrival.

The US may be configured as a list of up to M TCI-State configurations in higher layer parameter PDSCH-Config in order to decode the PDSCH according to detected PDCCH having an intended DCI for the corresponding UE and a given serving cell. The M depends on a UE capability.

Each TCI-State includes a parameter for configuring a quasi co-location relationship between one or two DL reference signals and a DM-RS port of the PDSCH.

The quasi co-location relationship is configured as higher layer parameter qcl-Type1 for a first DL RS and qcl-Type2 (when configured) for a second DL RS. Two DL RSs are not the same as each other in terms of QCL type regardless of whether two DL RS are DL RSs having the same reference or DL RSs having different references.

A quasi co-location type corresponding to each DL RS may be given by higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is specific NZP CSI-RS, corresponding NZP CSI-RS antenna ports may be indicated/configured to be QCL with specific TRS from the viewpoint of QCL-Type A and specific SSB from the viewpoint of QCL-Type D. The UE that receives the indication/configuration may receive the corresponding NZP CSI-RS by using a Doppler delay value measured in QCL-TypeA TRS and apply an Rx beam used for receiving QCL-TypeD SSB to reception of the corresponding NZP CSI-RS.

The UE may receive an activation command by MAC CE signaling used for mapping up to eight TCI states to codepoint of DCI field "Transmission Configuration Indication'.

Coexistence of LTE and NR—Supplementary Uplink

In order to solve an uplink coverage problem for the mmwave band of FR2 in NR, an additional uplink carrier may be configured to share and use the old LTE uplink frequency band with the uplink frequency band of the NR and this is referred to as Supplementary UL (SUL). The following contents are discussed in relation to the SUL. The SUL may be defined only in the uplink band of current LTE in RAN 4. Furthermore, the SUL may have different numerologies between the SUL and downlink (DL) of the same cell.

In respect to an SUL operation, a maximum of two uplink carriers per each downlink carrier in one cell may be configured. When the SUL is configured, the PUCCH may be semi-statically between the non-SUL and the SUL of a primary cell (PCell). When the SUL is configured, in the PUSCH, the non-SUL and the SUL of the primary cell (PCell) may be dynamically switched. Furthermore, PUSCH transmission in both the non-SUL and the SUL may not be simultaneously allowed. The SRS may be simultaneously transmitted in both uplink carriers. A PDCCH command may indicate which uplink to use for RACH transmission. In an RACH procedure (based on a contention), a non-SUL or SUL PRACH resource may be selected according to the RSRP.

Further, when TDM or FDM between LTE and NR uplink spectrums is considered, an LTE cell and an NR cell having the SUL in the same UL spectrum as the LTE cell may be considered.

For center frequency alignment between LTE and NR for minimizing RF readjustment of the UE, a 7.5 kHz frequency shift at an NR side by implementation of the UE may be considered. Furthermore, a 'latency' may be notified through capability information of the UE in order to support switching between the LTE and the NR.

The UL and the SUL may be configured for each individual power control parameter and it is possible to handle different numerologies between the SUL and the downlink. As an example, timing advanced (TA) may be configured according to a largest sub carrier spacing (SCS). A switching timing (e.g., PUCCH in the PDSCH, PUSCH in the PDSCH, etc.) may be configured according to a numerology of a scheduled or transmitted carrier. Alternatively, a switching timing to HARQ in the PDSCH may be determined according to a smaller numerology of the DL and the SUL.

As described above, a next-generation wireless communication system (hereinafter, referred to as an NR system for convenience of description), multiple component carriers (CCs) may be configured. A reference signal, a channel, etc., may be independently configured for each CC. As a result, there may be UE which need to perform component carrier switching (hereinafter, referred to as CC switching). In particular, in the case of an uplink CC, the CC switching may be required according to a capability of the UE.

For example, in the NR system, the CC switching between an uplink CC in frequency range 2 (FR2) above 6 GHz and an uplink CC in frequency range 1 (FR1) below 6 GHz may be considered.

As another example, in the NR system, CC switching for sounding reference signal (SRS) transmission without a physical uplink shared channel (PUSCH) and/or a physical uplink control channel (PUCCH) may be performed.

FIG. 13 illustrates an example of a method for obtaining downlink channel state information (CSI) by using reciprocity of uplink and downlink. FIG. 13(a) illustrates an example of a method for obtaining downlink CSI through an uplink SRS by using downlink and uplink reciprocities in a TDD scheme. FIG. 13(b) illustrates an example of a method for obtaining downlink CSI through an uplink SRS by using downlink and uplink reciprocities in an FDD scheme.

As a specific example, referring to FIG. 13(a), in a Time Division Duplex (TDD) scheme, the CC switching for the SRS transmission without the PUSCH and/or PUCCH may be considered by using the downlink and uplink reciprocities. The uplink SRS may be a Quasi co-location (QCL) relation with a downlink SS/PBCH resource block (SSB). The SRS may correspond to an SRS resource(s) or an SRS resource set for obtaining downlink CSI. Through the operation, valid (not out of date) downlink CSI may be quickly obtained through the uplink SRS. Furthermore, the BS may explicitly obtain the CSI and utilize the obtained CSI for reconstructing channel information.

As another example, referring to FIG. 13(b), in the case of a Frequency Division Duplex (FDD) scheme, a CC switching operation for the SRS transmission without the PUSCH and/or PUCCH may be configured for each component carrier (CC).

As yet another example, a case where Supplementary Uplink is configured in the NR system may be considered. As described above, the SUL represents an uplink carrier additionally configured so as to share and use the old LTE uplink frequency band with the NR uplink frequency band. In this case, the uplink (UL) of the SUL and the LTE in the NR system may operate in the TDD and CC switching for the SRS transmission in the SUL may be used for measuring whether to fall back to the LTE from the NR.

FIG. 14 illustrates an example of Tx beam mismatch between NR UL and SUL. Referring to FIG. 14, a problem of Tx beam mismatch between uplink (UL) (e.g., frequency range 2 (FR2)) and SUL (e.g., frequency range 1 (FR1)) of the NR may occur in the case of the above operation. In this case, the QCL relation between the NR UL (e.g., FR2) and the NR SUL (e.g., FR1) may not also be established. Further, the NR SUL may not have the QCL relation even with a reference signal(s) (e.g., SSB or CSI-RS) for downlink measurement of the NR UL.

FIG. 15 illustrates an example showing an uplink transmission disabling area which occurs during CC switching. Referring to FIG. 15, when CC switching such as switching to the SUL from an uplink (UL) component carrier (CC) of the NR or switching to the NR uplink (UL) component carrier (CC) from the SUL is performed, a measurement gap for preventing a transition depending on a frequency change may be considered. In this case, an uplink transmission disabling area of the UE occurs, and as a result, the uplink resource may be lost.

Further, since an NR uplink (UL) Tx beam and an SUL Tx beam of the UE may be different from each other, there may be a case where an SRS resource(s) and/or an SRS resource set(s) for beam management for the SUL should be transmitted for each CC and an SRS resource(s) and/or an SRS resource set(s) for CSI acquisition corresponding thereto should be transmitted for each CC. In this case, in NR uplink in which the CC switching is performed (according to a switching capability of the UE), uplink data my not be transmitted.

Accordingly, hereinafter, in the present disclosure, in an NR system in which multiple component carriers may be configured, a method and a device for performing uplink transmission by considering the component carrier switching (CC switching) of the UE may be considered. In particular, proposed are a method and a device which may minimize uplink resource loss due to the CC switching when CC switching for a short time such as the CC switching for transmitting the SRS without the PUSCH and/or PUCCH is required. As an example, for quick CC switching, configuring a beam association for a resource in a CC to be switched may be considered. The beam association may mean an uplink beam pair for an uplink Tx beam of the CC to be switched. For example, the beam association proposed in the present disclosure may mean an uplink beam pair (e.g., an uplink beam pair for the SUL Tx beam and/or the UL Tx beam) configured by considering a case where the SUL is configured and the mismatch of the Tx beam occurs between the NR UL and the NR SUL.

In embodiments described below, it is assumed that the SUL for the uplink transmission of the UE is configured. When the SUL is configured in the NR system, it may be measured whether to perform uplink fallback to an LTE frequency band from an NR frequency band by considering the component carrier (CC) switching. Here, when the SUL is configured in the NR system, it is assumed that the CC switching is made at a transmitting end and/or a receiving end in order to measure whether to perform the fallback to the uplink (e.g., SUL) of the LTE frequency band from the uplink (UL) of the NR frequency band.

Further, embodiments and/or methods described below are only classified for convenience of description and it is needless to say that the configuration of any embodiment and/or method may be substituted with the configuration of another embodiment and/or method may be applied in combination with each other.

<Method 1>

As described above, the NR system, multiple component carriers (CCs) may be configured. As an example, an additional uplink carrier such as Supplementary Uplink (SUL) may be configured in order to solve an uplink coverage problem. FIG. 16 illustrates an example in which the beam association is configured when the SUL is additionally configured.

The UE may require the component carrier switching (CC switching) for uplink transmission in different frequency bands (e.g., component carriers (CCs)). Various methods for minimizing the loss of the uplink resource by quickly performing the CC switching may be considered. FIG. 16(a) illustrates an example of configuring the beam association between the downlink resource and the uplink resource. Referring to FIG. 16(a), for example, the BS may configure the beam association between a downlink resource(s) (e.g., synchronization signal block(s) (SSB(s), CSI-RS resource(s), etc.) in the frequency band before the CC switching and an uplink resource(s) in the frequency band to be CC-switched. The beam association may mean an uplink beam pair for the uplink Tx beam and may be configured through a radio resource control (RRC) or a MAC-control element (MAC-CE). Hereinafter, specific examples to which the present disclosure may be applied will be described. Each example is just an example to which the present disclosure may be applied and does not limit the technical spirit of the present disclosure.

As an example, the BS may configure the beam association between the downlink resource(s) before the CC switching and a resource(s) of a non codebook sounding reference signal (SRS) resource set which is (are) the uplink resource(s) to be CC-switched. The BS may configure the beam association between ID(s) (e.g., SSB Identification(s) (SSBID(s)) and/or CSI-RS resource indicator(s) (CRI(s)) of the downlink resource before the CC switching and an SRS Resource Indicator(s) (SRI(s)) indicating the resource(s) of the SRS resource set through the RRC or MAC-CE.

As a specific example, the beam association between SSBID 0 of the downlink (DL) resource of NR FR2 and SRI 0 of the NR SUL resource may be configured through the RRC or MAC-CE. Alternatively, the beam association between NR FR2 DL SSBID 1 and NR SUL SRI 2 may be configured through the RRC or MAC-CE. Alternatively, the beam association between NR FR2 DL CRI 0 and NR SUL SRI 3 may be configured through the RRC or MAC-CE. Alternatively, the beam association between NR FR2 DL CRI 1 and NR SUL SRI 3 may be configured through the RRC or MAC-CE.

As another example, the BS may configure the beam association between the downlink resource(s) before the CC switching and a resource(s) of a codebook based SRS resource set which is (are) the uplink resource(s) to be CC-switched. The BS may configure the beam association between ID(s) (e.g., SSBID(s) and/or CRI(s)) of the downlink resource before the CC switching and a Transmitted Precoding Matrix Indicator(s) (TPMI(s)) and/or a Transmitted Resource Indicator(s) (TRI(s)) indicating precoding information for the resource of the SRS resource set through the RRC or MAC-CE.

As a specific example, the beam association between SSBID 0 of the NR FR2 downlink (DL) resource and TPMI 0 and/or TRI 0 of the NR SUL resource may be configured through the RRC or MAC-CE. Alternatively, the beam association between NR FR2 DL SSBID 1 and NR SUL TPMI 0 and/or TRI 0 may be configured through the RRC or MAC-CE. Alternatively, the beam association between NR FR2 DL CRI 0 and NR SUL TPMI 0 and/or TRI 0 may be configured through the RRC or MAC-CE. Alternatively, the beam association between NR FR2 DL CRI 1 and NR SUL TPMI 0 and/or TRI 0 may be configured through the RRC or MAC-CE.

As another example, in the wireless communication system, for the CC switching, the BS may configure the beam association between the downlink resource(s) before the CC switching and the uplink resource set to be CC-switched. The BS may configure the beam association between the downlink resource(s) (e.g., SSB(s) and CSI-RS resource(s)) before the CC switching and the uplink SRS resource set to be CC-switched. The association may be configured through the RRC or MAC-CE.

As a specific example, the beam association between NR FR2 DL SSBID 0 and NR SUL SRS set 0 may be configured through the RRC or MAC-CE. Alternatively, the beam association between NR FR2 DL SSBID 1 and NR SUL SRS set 2 may be configured through the RRC or MAC-CE. Alternatively, the beam association between NR FR2 DL CRI 0 and NR SUL SRS set 3 may be configured through the RRC or MAC-CE. Alternatively, the beam association between NR FR2 DL CRI 1 and NR SUL SRS set 3 may be configured through the RRC or MAC-CE.

<Method 2>

As described above, in the wireless communication system, component carrier (CC) switching (hereinafter, referred to as CC switching) may be required. Various methods for minimizing the loss of the uplink resource by quickly performing the CC switching may be considered. As an example, the BS may configure the beam association between the uplink resources in different frequency bands during the CC switching. The beam association may mean an uplink beam pair for an uplink Tx beam. The different frequency bands may represent CCs which are different in numerology. Alternatively, the different frequency bands may represent CCs which are different in beam forms such as a shape, a direction, a range, etc., of the beam. As a specific example, the different frequency bands may correspond to frequency range 2 (FR2) above 6 Ghz and frequency range 1 (FR1) below 6 Ghz in the NR system. The beam association may be configured through the RRC or MAC-CE.

Hereinafter, specific examples to which the present disclosure may be applied will be described. Each example is just an example to which the present disclosure may be applied and does not limit the technical spirit of the present disclosure.

FIG. 16(a) illustrates an example of configuring the beam association between the uplink resources. Referring to FIG. 16(b), for example, the BS may configure, through the RRC or MAC-CE, the beam association between an SRS resource indicator (SRI), a Transmitted Precoding Matrix Indicator (TPMI), and/or a Transmitted Resource Indicator (TRI) for the uplink resource(s) before the CC switching and the SRI, TPMI, and/or TRI for the uplink resource(s) to be CC-switched.

As a specific example, the beam association between NR FR2 DL TPMI 0 and/or TRI 0 and NR SUL TPMI 0 and/or TRI 0 may be configured through the RRC or MAC-CE. Alternatively, the beam association between NR FR2 DL TPMI 1 and/or TRI 1 and NR SUL TPMI 0 and/or TRI 0 may be configured through the RRC or MAC-CE. Alternatively, the beam association between NR FR2 DL TPMI 0 and/or TRI 0 and NR SUL SRI 0 may be configured through the RRC or MAC-CE. Alternatively, the beam association between NR FR2 DL TPMI 1 and/or TRI 1 and NR SUL SRI 0 may be configured through the RRC or MAC-CE.

As another example, as described above, the BS may configure the beam association between the uplink resource(s) in different frequency bands. Here, the beam association may be configured in units of the set of the resource. The different frequency bands may represent CCs which are different in numerology. Alternatively, the different frequency bands may represent CCs which are different in beam forms such as a shape, a size, a direction, a range, etc., of the beam. The BS may configure the beam association between the uplink SRS resource sets in each component carrier. The beam association may be configured through the RRC or MAC-CE.

As a specific example, the BS may configure the beam association between NR FR2 SRS set 0 and NR SUL SRS set 0 through the RRC or MAC-CE. Alternatively, the BS may configure the beam association between NR FR2 SRS set 2 and NR SUL SRS set 2 through the RRC or MAC-CE.

<Method 3>

According to Methods 1 and 2 described above, the BS may configure the beam association between the resource in the frequency band before the CC switching and the resource in the frequency band to be C-switched for quick CC switching.

Further, the BS may control whether to enable the configuration for the beam association. For example, the BS may transmit, to the UE, a control signal to enable or disable the configured beam association. The enabling may be expressed as a term such as ON, activation, etc., and the disabling may be expressed as a term such as OFF, deactivation, etc. The control signal may be delivered to the UE through the higher layer (e.g., RRC).

TABLE 7

|  | Enable | Disable |
|---|---|---|
| Beam association control parameter | 0 | 1 |

Table 7 shows an example of a control signal (or parameter) to control whether to enable the configuration for the beam association. Referring to Table 9, the control signal related to whether to enable the configuration for the beam association may be defined. The BS may transmit the control signal to the UE and the UE may perform uplink transmission based on the control signal. When the control signal is in an enable state, the UE may operate based on the configuration for the beam association configured by the BS according to Methods 1 and 2 described above. On the contrary, when the control signal is in a disable state, the uplink Tx beam of the SRS resource(s) for CSI acquisition during the CC switching may be indicated by using the QCL relation between the uplink and the downlink configured previously.

Through the method, the uplink Tx beam may be utilized as a Tx beam for the SRS resource(s) or the SRS resource set for CSI acquisition during the CC switching by using the aforementioned beam association without the QCL relation.

As another example, it may be considered that the beam association may be configured in units of the SRS resource set as in Methods 1 and 2 described above. In this case, the control signal related to whether to enable the configuration for the beam association may be configured in units of the SRS resource set. The control signal may be configured through the higher layer (e.g., RRC). Further, the BS may notify, to the UE, whether to enable the configuration for the beam association based on the control signal. As a specific example, when the control signal indicates the enabling, the UE may perform the uplink transmission according to the beam association configured by the BS according to Methods 1 and 2 above. On the contrary, when the control signal indicates the disabling, the BS may utilize the corresponding beam as the Tx beam of the SRS resource(s) in the SRS resource set by using the QCL relation between the SRS resource(s) and the downlink resource(s) in the SRS resource set.

As another example, it may be considered that the beam association between the uplink resources in different bands having different characteristics as in Method 2 described above. A control signal to controlling the beam association between the uplink resources in different bands and the BS may transmit the control signal to the UE. The BS may control whether to enable the configuration for the beam association to be applied to the UE based on the control signal. Here, the control signal may be configured per SRS resource set. When the control signal indicates the enabling, the UE may perform the uplink transmission according to the beam association configured by the BS. On the contrary, when the control signal indicates the disabling, the Tx beam of the SRS resource(s) in the SRS resource set for CSI acquisition of the uplink to be switched may be indicated during the CC switching by using the QCL relation of the SRS resource sets between preconfigured uplink CCs.

<Method 4>

As described above, in the wireless communication system, component carrier (CC) switching (hereinafter, referred to as CC switching) may be required. Various methods for minimizing the loss of the uplink resource by quickly performing the CC switching may be considered. As an example, the BS may configure the beam association between the resource in the component carrier (CC) to be CC-switched and the uplink resource to be CC-switched during the CC switching. The beam association may mean an uplink beam pair for the uplink Tx beam and may be configured through the RRC or MAC-CE. Hereinafter, specific examples to which the present disclosure may be applied will be described. Each example is just an example to which the present disclosure may be applied and does not limit the technical spirit of the present disclosure.

For example, the CC switching for the SRS transmission without the PUSCH and/or PUCCH may be considered. The BS may utilize a previous random access channel (RACH) transmitted for uplink synchronization in the component carrier (CC) to be CC-switched for a beam indication for the SRS resource set for the CSI acquisition. In other words, the BS may configure the beam association between the RACH and the SRS resource set in the component carrier to be CC-switched. The association may be configured through the higher layer (e.g., RRC).

As a specific example, the beam association between the uplink (UL) Tx beam mapped with Message1 (MSG1) transmission in the RACH procedure and the SRS resource(s) may be configured through the higher layer (e.g., RRC) per component carrier (CC). Alternatively, the beam association between the uplink (UL) Tx beam used for Message3 (MSG3) transmission in the RACH procedure and the SRS resource(s) may be configured through the higher layer (e.g., RRC) per component carrier (CC). Alternatively, the beam association between the uplink (UL) Tx beam used for the MSG1 and MSG3 transmission in the RACH procedure and the SRS resource(s) may be configured through the higher layer (e.g., RRC) per component carrier (CC).

As another example, the BS may configure the beam association between the SRI, CRI, and/or SSBID of the uplink resource which is most recently received in the component carrier (CC) to be CC-switched and the SRS resource set for the beam indication for the SRS resource set for the CSI acquisition during the CC switching. The association may be configured through the RRC or MAC-CE.

As yet another example, the BS may configure the beam association between the SRI, CRI, and/or SSBID of the uplink resource which is received from slot n-k to most recent slot n which belong to an uplink timing window in the component carrier (CC) to be CC-switched for the beam indication for the SRS resource set for the CSI acquisition during the CC switching. The association may be configured through the higher layer (e.g., RRC) or the MAC-CE.

Furthermore, the beam(s) for the SRS resource set for the CSI acquisition may refer to beams having a meaning of encompassing the beam for the uplink of a most recently CC-switched active CC.

As described above, the beam association for the quick CC switching may be configured according to Methods 1 to 4. Furthermore, the BS may transmit a trigger signal for notifying whether the UE is to apply the configuration for the beam association. As a specific example, the trigger which may activate or deactivate the configured beam association may be configured through the MAC-CE. The trigger signal may be delivered to the UE through the MAC-CE. When the control signal indicates the activation, the UE may perform the uplink transmission according to the beam association configured by the BS. On the contrary, when the trigger signal indicates the deactivation, the UE may not apply the beam association. Alternatively, the BS may activate the beam association through the MAC-CE and then configure the UE to operate according to the beam association during a predetermined timing window having a length of K. In this case, the K may be configured through the higher layer (RRC).

Through the embodiments and methods proposed in the present disclosure, when the CC switching is accompanied in the uplink transmission, the CC switching operation may be quickened through the configuration of the beam association. Furthermore, there is an effect that the loss of the uplink resource due to a gap (e.g., a measurement gap) considered during the CC switching may be reduced.

FIG. 17 illustrates an example of an operation flowchart of a user equipment (UE) performing uplink transmission to which an embedment proposed in the present disclosure may be applied. FIG. 17 is just for convenience of the description and does not limit the scope of the present disclosure.

Referring to FIG. 17, it is assumed that the UE and/or the BS operate(s) based the methods and/or embodiments of Methods 1 to 4 described above. In particular, the corresponding UE and/or BS may perform the uplink transmission based on the configuration for the beam association for the quick CC switching in the uplink transmission accompanying the CC switching proposed in the present disclosure and a specific procedure is as follows.

The UE may receive, from the BS, a configuration relating to a beam association between a resource in a first frequency band and a resource in a second frequency band (S1710). The first frequency band and the second frequency band may not overlap with each other.

For example, the configuration for the beam association may be based on Methods 1 to 4 described above. Here, the beam association may mean an uplink beam pair for an uplink Tx beam. As an example, the first frequency band may be defined as a frequency band encompassing a master cell group (MCG) and the second frequency band may be defined as a frequency band encompassing a secondary cell group (SCG) or a frequency band encompassing another MCG other than the first frequency band. Alternatively, the first frequency band and the second frequency band may correspond to component carriers (CCs). Alternatively, the first frequency band and the second frequency band may represent CCs which are different in numerology. Alternatively, the first frequency band and the second frequency band may represent CCs which are different in beam forms such as a shape, a size, a direction, a range, etc., of the beam.

As a specific example, the UE may receive a configuration for the beam association between a downlink resource(s) (e.g., synchronization signal block(s) (SSB(s)), CSI-RS resource(s), etc.) before the CC switching (e.g., first frequency band) and an uplink resource(s) to be CC-switched (e.g., second frequency band). Alternatively, the UE may receive a configuration for the beam association between the downlink resource(s) (e.g., SSB(s), CSI-RS resource(s), etc.) before the CC switching (e.g., first frequency band) and the uplink SRS resource set to be CC-switched (e.g., second frequency band). Alternatively, the UE may receive a configuration for a beam association between uplink resources in different bands. Alternatively, the UE may receive a configuration for a beam association between uplink SRS resource sets in respective component carriers (CCs) of the different bands. Alternatively, the UE may receive a beam association between a resource in a component carrier (CC) (e.g., second frequency band) to be CC-switched and an uplink resource to be switched. The beam association may be configured through the higher layer (e.g., RRC) or the MAC-CE.

The UE may receive, from the BS, allocating the resource in the first frequency band (S1720). For example, the resource may mean an uplink and/or downlink resource.

The UE may perform switching from the first frequency band to the second frequency band (S1730). For example, in the NR system, the switching may correspond to CC switching between an uplink CC in frequency range 2 (FR2) above 6 GHz and an uplink CC in frequency range 1 (FR1) below 6 GHz. Alternatively, in the NR system, the switching may correspond to CC switching for sounding reference signal (SRS) transmission without a physical uplink shared channel (PUSCH) and/or a physical uplink control channel (PUCCH). Alternatively, when the SUL is configured in the NR system, the SUL and uplink (UL) of the LTE may operate by TDD and may correspond to CC switching for measuring whether to perform fallback to the SUL in the LTE frequency band from the UL in the NR frequency band.

The UE may receive, from the BS, allocating the resource in the second frequency band (S1740). For example, the resource may mean the uplink resource. Alternatively, the resource may correspond to a supplementary uplink (SUL) resource. Alternatively, the resource may correspond to the resource(s) in the sounding reference signal (SRS) resource set. Alternatively, the resource may correspond to the SRS resource set.

The UE may perform, based on the configuration for the beam association, perform the uplink transmission in the resource in the second frequency band to the BS. For example, the uplink transmission may correspond to the SRS transmission without the PUSCH and/or PUCCH.

FIG. 18 illustrates another example of the operation flowchart of the UE performing uplink transmission to which an embedment proposed in the present disclosure may be applied. FIG. 18 is just for convenience of the description and does not limit the scope of the present disclosure.

Referring to FIG. 18, it is assumed that the UE and/or the BS operate(s) based the methods and/or embodiments of Methods 1 to 4 described above. In particular, the corresponding UE and/or BS may perform the uplink transmission based on the configuration for the beam association for the quick CC switching in the uplink transmission accompanying the CC switching proposed in the present disclosure and a specific procedure is as follows.

The UE may receive, from the BS, a configuration for a beam association between a resource in a first frequency band and a resource in a second frequency band (S1810). The first frequency band and the second frequency band may not overlap with each other.

The UE may receive, from the BS, a control signal relating to whether to activate the configuration for the beam association. For example, the control signal may be based on Method 3 described above. The control signal may control whether to activate the configuration for the beam association. The control signal may be configured even in units of the SRS resource set. The control signal may be configured through the higher layer (e.g., RRC).

As a specific example, when the control signal is in an enable state, the UE may operate based on the configuration for the beam association configured by the BS according to Methods 1 and 2 described above. On the contrary, when the control signal is in a disable state, the UE may perform the uplink transmission based on one QCL relation of i) a QCL relation between uplink and downlink in the first frequency band, ii) a QCL relation between the downlink resource in the first frequency band and the resource in the SRS resource set in the second frequency band, or iii) a QCL relation between the uplink resource in the first frequency band and the SRS resource set in the second frequency band.

The UE may receive, from the BS, allocating the resource in the first frequency band (S1830). The UE may perform switching from the first frequency band to the second frequency band (S1840). The UE may receive, from the BS, allocating the resource in the second frequency band (S1850). Steps S1810 and S1830 to S1850 may correspond to steps S1710 to S1740 of FIG. 17. Accordingly, hereinafter, a duplicated description will be omitted.

The UE may perform the uplink transmission in the resource in the second frequency band to the BS (S1860). For example, when the control signal is in an enable state, the UE may perform the uplink transmission based on the received configuration for the beam association. On the contrary, when the control signal is in a disable state, the UE may perform the uplink transmission based on a preconfigured QCL relation as described above. Here, the uplink transmission may correspond to the SRS transmission without the PUSCH and/or PUCCH.

FIG. 19 illustrates an example of an operation flowchart of a base station (BS) receiving uplink transmission in a wireless communication system to which a method proposed in the present disclosure may be applied. FIG. 19 is just for convenience of the description and does not limit the scope of the present disclosure.

Referring to FIG. 19, it is assumed that the UE and/or the BS operate(s) based the methods and/or embodiments of Methods 1 to 4 described above. In particular, the corresponding UE and/or BS may perform the uplink transmission based on the configuration for the beam association for the quick CC switching in the uplink transmission accompanying the CC switching proposed in the present disclosure and a specific procedure is as follows.

The BS may transmit, to the UE, a configuration relating to a beam association between a resource in a first frequency band and a resource in a second frequency band (S1910). The first frequency band and the second frequency band may not overlap with each other.

For example, the configuration for the beam association may be based on Methods 1 to 4 described above. Here, the beam association may mean an uplink beam pair for an uplink Tx beam. As an example, the first frequency band may be defined as a frequency band encompassing a master cell group (MCG) and the second frequency band may be defined as a frequency band encompassing a secondary cell group (SCG) or a frequency band encompassing another MCG other than the first frequency band. Alternatively, the first frequency band and the second frequency band may correspond to component carriers (CCs). Alternatively, the first frequency band and the second frequency band may represent CCs which are different in numerology. Alternatively, the first frequency band and the second frequency band may represent CCs which are different in beam forms such as a shape, a size, a direction, a range, etc., of the beam.

As a specific example, the BS may configure the beam association between a downlink resource(s) (e.g., SSB(s) (synchronization signal block(s)), CSI-RS resource(s), etc.) before the CC switching (e.g., first frequency band) and an uplink resource(s) to be CC-switched (e.g., second frequency band). Alternatively, the BS may configure the beam association between the downlink resource(s) (e.g., SSB(s), CSI-RS resource(s), etc.) before the CC switching (e.g., first frequency band) and the uplink SRS resource set to be CC-switched (e.g., second frequency band). Alternatively, the BS may configure a beam association between uplink resources in different bands. Alternatively, the BS may configure a beam association between uplink SRS resource sets in respective component carriers (CCs) of the different bands. Alternatively, the BS may receive a beam association between a resource in a component carrier (CC) (e.g., second frequency band) after CC switching and an uplink resource to be switched. The BS may transmit, to the UE, the configuration for the beam association through a higher layer (e.g., RRC) or MAC-CE.

The BS may transmit, to the UE, a control signal relating to whether to activate the configuration for the beam association (S1920). For example, the control signal may be based on Method 3 described above. The control signal may control whether to activate the configuration for the beam association. The control signal may be configured even in units of the SRS resource set. The control signal may be configured through the higher layer (e.g., RRC). As a specific example, when the control signal is in an enable state, the uplink transmission based on the configuration for the beam association configured by the BS may be received according to Methods 1 and 2 described above. On the contrary, when the control signal is in a disable state, the BS may perform the uplink transmission based on a preconfigured QCL relation.

Furthermore, the BS may transmit a trigger signal for notifying whether the UE is to apply the configuration for the beam association (S1930). As a specific example, when the trigger signal indicates activation, the trigger signal may indicate a meaning of instructing the UE to perform the uplink transmission based on the configuration for the beam association. On the contrary, when the trigger signal indicates deactivation, the UE may not apply the configuration for the beam association. The trigger signal may be delivered to the UE through the MAC-CE.

A step of transmitting the control signal in step S1920 above and/or the trigger signal in step S1930 above may be omitted in some cases.

The BS may receive allocating the resource in the resource in the first frequency band to the UE (S1940). For example, the resource may mean an uplink and/or downlink resource.

The BS may allocate the resource in the second frequency band to the UE (S1950). For example, the resource may mean the uplink resource. Alternatively, the resource may correspond to a supplementary uplink (SUL) resource. Alternatively, the resource may correspond to the resource(s) in the sounding reference signal (SRS) resource set. Alternatively, the resource may correspond to the SRS resource set.

The BS may receive, based on the configuration for the beam association, an uplink which the UE transmits in the resource in the second frequency band. For example, the uplink transmission may correspond to the SRS transmission without the PUSCH and/or PUCCH.

Overview of Devices to which Present Disclosure is Applicable

FIG. 20 is a block diagram of a wireless communication device to which methods proposed in the present disclosure may be applied.

Referring to FIG. 20, a wireless communication system may include a first device 2010 and a second device 2020.

The first device 2010 may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin-tec device (or financial device), a security device, a climate/ environmental device, devices related to 5G services, or other devices related to fourth industrial revolution fields.

The second device 2020 may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin-tec device (or financial device), a security device, a climate/ environmental device, devices related to 5G services, or other devices related to fourth industrial revolution fields.

For example, the UE may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tec device may be a device capable of providing financial services such as mobile payment. For example, the pin-tec device may include a payment device or a point of sales (POS). For example, the climate/environmental device may include a device for monitoring or predicting a climate/environment.

The first device 2010 may include at least one processor, such as a processor 2011, at least one memory, such as a memory 2012, and at least one transceiver, such as a transceiver 2013. The processor 2011 may perform the functions, procedures, and/or methods described above. The processor 2011 may perform one or more protocols. The processor 2011 may perform one or more layers of a radio interface protocol. The memory 2012 may be connected to the processor 2011 and store various types of information and/or commands. The transceiver 2013 may be connected to the processor 2011 and controlled to transmit/receive a radio signal.

As a specific example, the processor 2011 controls the transceiver 2013 to transmit, to the second device 2020, a configuration relating to a beam association between a resource in a first frequency band and a resource in a second frequency band (S1910). Here, the first frequency band and the second frequency band may not overlap with each other. Alternatively, the first frequency band and the second frequency band may correspond to component carriers (CCs). Furthermore, the processor 2011 controls the transceiver 2013 to transmit, to the second device 2020, a control signal related to whether to activate the configuration for the beam association (S1920). Furthermore, the processor 2011 controls the transceiver 2013 to transmit, to the second device 2020, a trigger signal for notifying whether the second device 2020 is to apply the configuration for the beam association (S1930). In this case, transmission of the control signal and/or the trigger signal may be omitted in some cases. Further, the processor 2011 controls the transceiver 2013 to allocate, to the second device 2020, the resource in the first frequency band (S1940) and allocate the resource in the second frequency band (S1950). Furthermore, the processor 2011 controls the transceiver 2013 to receive, from the second device 2020, an uplink transmitted in the resource in the second frequency based on the configuration for the beam association (S1960).

The second device 2020 may include at least one processor, such as a processor 2021, at least one memory, such as a memory 2022, and at least one transceiver, such as a transceiver 2023. The processor 2021 may perform the functions, procedures, and/or methods described above. The processor 2021 may implement one or more protocols. For example, the processor 2021 may implement one or more layers of the radio interface protocol. The memory 2022 may be connected to the processor 2021 and store various types of information and/or commands. The transceiver 2023 may be connected to the processor 2021 and controlled to transmit/receive a radio signal.

As a specific example, the processor 2021 controls the transceiver 2023 to receive, from the first device 2010, a configuration for a beam association between a resource in a first frequency band and a resource in a second frequency band (S1710). Here, the first frequency band and the second frequency band may not overlap with each other. Alternatively, the first frequency band and the second frequency band may correspond to component carriers (CCs). Further, the processor 2021 controls the transceiver 2023 to receive allocating the resource in the first frequency band from the first device 2010 (S1720). Furthermore, the processor 2021 controls the transceiver 2023 to perform switching from the first frequency band to the second frequency band (S1730). Further, the processor 2021 controls the transceiver 2023 to receive allocating the resource in the second frequency band from the first device 2010 (S1740). Furthermore, the processor 2021 controls the transceiver 2023 to perform the uplink transmission to the first device 2010 in the resource in the second frequency based on the configuration for the beam association (S1750).

The memory 2012 and/or the memory 2022 may be each connected inside or outside the processor 2011 and/or the processor 2021 and connected to other processors through various techniques such as wired or wireless connection.

The first device 2010 and/or the second device 2020 may have one or more antennas. For example, an antenna 2014 and/or an antenna 2024 may be configured to transmit and receive the radio signal.

Figure 21:
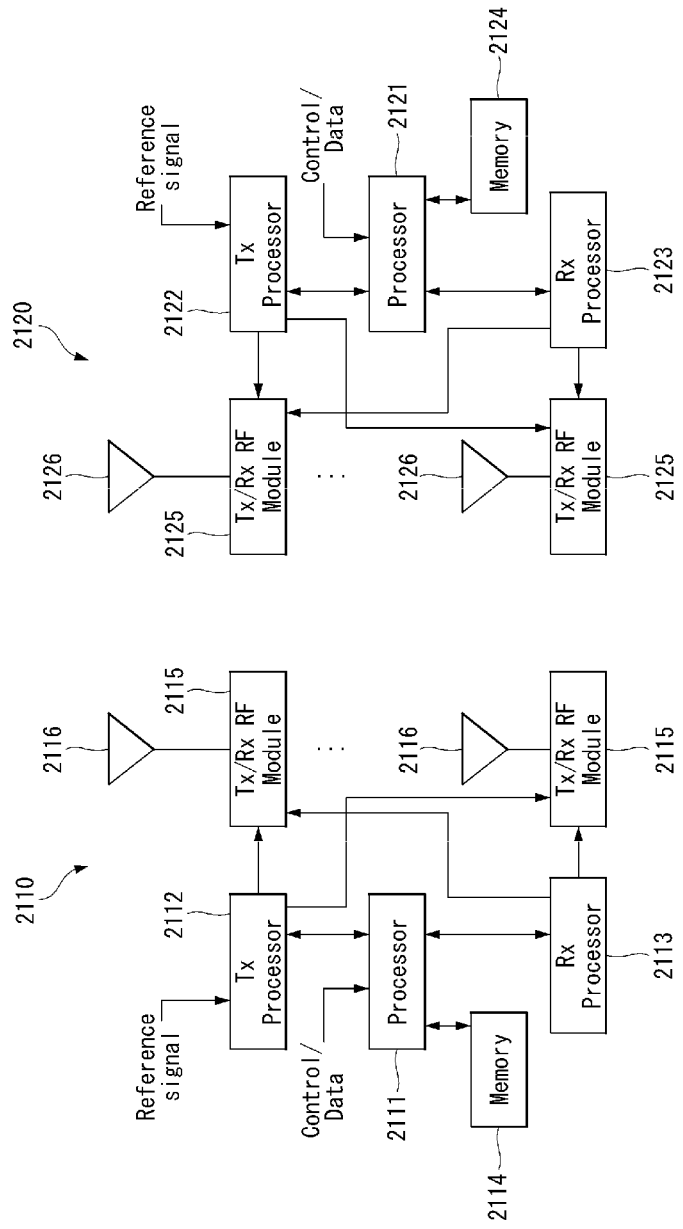
FIG. 21 illustrates another example of a block diagram of a wireless communication device to which methods proposed in the present disclosure may be applied.

FIG. 21 illustrates another example of the block diagram of the wireless communication device to which the methods proposed in this disclosure may be applied.

Referring to FIG. 21, a wireless communication system includes an eNB 2110 and multiple user equipments 2120 positioned within an area of the eNB. The eNB may be represented by a transmitting apparatus and the UE may be represented by a receiving apparatus, or vice versa. The eNB and the UE include processors (2111,2121), memories (2114,2124), one or more Tx/Rx radio frequency (RF) modules (2115,2125), Tx processors (2112,2122), Rx processors (2113, 2123) and antennas (2116, 2126). The processor implements a function, a process, and/or a method which are described above. More specifically, a higher layer packet from a core network is provided to the processor 2111 in DL (communication from the eNB to the UE). The processor implements a function of an L2 layer. In the DL, the processor provides multiplexing between a logical channel and a transmission channel and allocation of radio resources to the UE 2120, and takes charge of signaling to the UE. The transmit (TX) processor 2112 implement various signal processing functions for an L1 layer (i.e., physical layer). The signal processing functions facilitate forward error correction (FEC) at the UE and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas 2116 via individual Tx/Rx modules (or transceivers, 2115). Each Tx/Rx module may modulate an RF carrier into each spatial stream for transmission. In the UE, each Tx/Rx module (or transceiver, 2125) receives a signal through each antenna 2126 of each Tx/Rx module. Each Tx/Rx module reconstructs information modulated with the RF carrier and provides the reconstructed information to the receive (RX) processor 2123. The RX processor implements various signal processing functions of layer 1. The RX processor may perform spatial processing on information in order to reconstruct an arbitrary spatial stream which is directed for the UE. When multiple spatial streams are directed to the UE, the multiple spatial streams may be combined into a single OFDMA symbol stream by multiple RX processors. The RX processor transforms the OFDMA symbol stream from the time domain to the frequency domain by using fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the eNB. The soft decisions may be based on channel estimation values. The soft decisions are decoded and deinterleaved to reconstruct data and control signals originally transmitted by the eNB on the physical channel. The corresponding data and control signals are provided to the processor 2121.

UL (communication from the UE to the eNB) is processed by the eNB 2110 in a scheme similar to a scheme described in association with a receiver function in the UE 2120. Each Tx/Rx module 2125 receives the signal through each antenna 2126. Each Tx/Rx module provides the RF carrier and information to the RX processor 2123. The processor 2121 may be associated with the memory 2124 storing a program code and data. The memory may be referred to as a computer readable medium.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to a specific claim may be combined with another claim referring to the claims other than the specific claim to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL APPLICABILITY

Although a method for performing uplink transmission in a wireless communication system of the present disclosure has been described with reference to an example applied to a 3GPP LTE/LTE-A system or a 5G system (New RAT system), the method may be applied to various wireless communication systems in addition to the 3GPP LTE/LTE-A system or 5G system.

The invention claimed is:

1. A method for performing, by a user equipment (UE), uplink transmission in a wireless communication system, the method comprising:
  receiving, from a base station, a configuration for a beam association between a resource in a first frequency band and a resource in a second frequency band;
  receiving, from the base station, a resource allocation in the first frequency band, wherein the first frequency band does not overlap with the second frequency band;
  switching the first frequency band to the second frequency band;
  receiving, from the base station, a resource allocation in the second frequency band; and
  based on the configuration for the beam association, performing the uplink transmission on the resource in the second frequency band.

2. The method of claim 1, wherein the configuration for the beam association is related to i) a beam association between a downlink resource in the first frequency band and an uplink resource in the second frequency band or ii) a beam association between an uplink resource in the first frequency band and the uplink resource in the second frequency band.

3. The method of claim 2, wherein the uplink resource in the second frequency band corresponds to a resource in an SRS resource set or the SRS resource set.

4. The method of claim 3, wherein the configuration for the beam association is configured as a beam association between an SSB identification (SSBID) and/or a CSI-RS resource indicator (CRI) of the resource in the first frequency band and an SRS resource indicator (SRI) of the resource in the second frequency band.

5. The method of claim 1, wherein a first frequency domain and a second frequency domain correspond to component carrier (CC) that is different in at least one of a form of beam and/or numerology.

6. The method of claim 1, wherein the first frequency domain is a component carrier (CC) in a frequency band above 6 GHz, and the second frequency domain is a CC in a frequency band under 6 GHz.

7. The method of claim 6, wherein the resource in the second frequency band corresponds to a supplementary uplink (SUL) resource.

8. The method of claim 7, wherein the uplink transmission is sounding reference signal (SRS) transmission without a physical uplink control channel (PUCCH) and/or a physical uplink shared channel (PUSCH).

9. The method of claim 1, wherein the configuration for the beam association is configured through a radio resource control (RRC) or an MAC control element (MAC-CE).

10. The method of claim 1, further comprising:
  receiving, from the base station, a control signal relating to whether to activate the configuration for the beam association.

11. The method of claim 10, wherein when the configuration for the beam association is disabled based on the control signal, the uplink transmission is performed based on one QCL relation of:
  i) a QCL relation between uplink and downlink in the first frequency band,
  ii) a QCL relation between the downlink resource in the first frequency band and the resource in the SRS resource set in the second frequency band, or
  iii) a QCL relation between the uplink resource in the first frequency band and the SRS resource set in the second frequency band.

12. The method of claim 1, wherein when the configuration for the beam association is configured based on a random access channel (RACH) in the second frequency band, the beam association is configured according to one of:
  i) a beam association between an uplink Tx beam of Message1 (MSG1) of the RACH in the second frequency band and the SRS resource set,
  ii) a beam association between an uplink Tx beam of Message3 (MSG3) of the RACH in the second frequency band and the SRS resource set, or
  iii) a beam association between uplink Tx beams of MSG1 and MSG3 in the second frequency band and the SRS resource set.

13. The method of claim 1, further comprising:
  receiving, from the base station, a trigger signal relating to whether to apply the configuration for the beam association.

14. A user equipment (UE) performing uplink transmission in a wireless communication system, the UE comprising:
  a Radio Frequency (RF) unit for transmitting/receiving a radio signal; and
  a processor functionally connected to the RF unit,
  wherein the processor is configured to
  receive, from a base station, a configuration for a beam association between a resource in a first frequency band and a resource in a second frequency band,
  receive, from the base station, a resource allocation in the first frequency band,
  perform switching from the first frequency band to the second frequency band,
  receive, from the base station, a resource allocation in the second frequency band, and
  based on the configuration for the beam association, perform the uplink transmission in the resource in the second frequency band to the base station, and
  wherein the first frequency band and the second frequency band do not overlap with each other.

15. A base station receiving uplink transmission of a UE in a wireless communication system, the base station comprising:
  a Radio Frequency (RF) unit for transmitting/receiving a radio signal; and
  a processor functionally connected to the RF unit,
  wherein the processor is configured to
  transmit, to the UE, a configuration for a beam association between a resource in a first frequency band and a resource in a second frequency band,
  transmit, to the UE, a resource allocation in the first frequency band,
  transmit, to the UE, a resource allocation in the second frequency band, and
  receive, from the UE, the uplink transmission based on the configuration for the beam association,
  wherein the uplink is transmitted in the resource in the second frequency band after switching from the first frequency band to the second frequency band, and wherein the first frequency band and the second frequency band do not overlap with each other.

* * * * *